(12) United States Patent
Sasaki et al.

(10) Patent No.: US 12,374,041 B2
(45) Date of Patent: Jul. 29, 2025

(54) SURVEYING ASSISTANCE SYSTEM, INFORMATION DISPLAY TERMINAL, SURVEYING ASSISTANCE METHOD, AND STORAGE MEDIUM STORING SURVEYING ASSISTANCE PROGRAM

(71) Applicant: TOPCON CORPORATION, Tokyo (JP)

(72) Inventors: Takeshi Sasaki, Tokyo (JP); Nobuyuki Fukaya, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 259 days.

(21) Appl. No.: 18/177,792

(22) Filed: Mar. 3, 2023

(65) Prior Publication Data
US 2023/0290055 A1  Sep. 14, 2023

(30) Foreign Application Priority Data

Mar. 8, 2022 (JP) ................. 2022-034899

(51) Int. Cl.
*G06T 17/05* (2011.01)
*G01C 15/00* (2006.01)
*G06T 7/70* (2017.01)

(52) U.S. Cl.
CPC .............. *G06T 17/05* (2013.01); *G01C 15/00* (2013.01); *G06T 7/70* (2017.01); *G06T 2207/10028* (2013.01); *G06T 2210/56* (2013.01)

(58) Field of Classification Search
CPC . G06T 17/05; G06T 7/70; G06T 2207/10028; G06T 2210/56; G06T 19/006;
(Continued)

(56) References Cited

U.S. PATENT DOCUMENTS 9,088,787 B1 *  7/2015  Smith ............... H04N 13/194
10,893,190 B2 *  1/2021  Schuett ............... G06T 7/248
(Continued)

FOREIGN PATENT DOCUMENTS

CN  112762957 A  *  5/2021  ............ G01C 11/00
EP  3246660 A1  11/2017
(Continued)

OTHER PUBLICATIONS

Khoury, Hiam et al. Evaluation of position tracking technologies for user localization in indoor construction environments [online]. Oct. 27, 2008 [retrieved on Apr. 3, 2025]. Retrieved from the Internet: <URL: https://www.sciencedirect.com/science/article/pii/S0926580508001647#sec13> (Year: 2008)*
(Continued)

*Primary Examiner* — King Y Poon
*Assistant Examiner* — Michelle Hau Ma
(74) *Attorney, Agent, or Firm* — Chiesa Shahinian & Giantomasi PC

(57) ABSTRACT

A surveying assistance system includes an information display terminal and a surveying device configured to measure a point cloud in a three-dimensional space. The surveying assistance system includes a terminal display unit configured to show a first image of a measurement site captured from a position of the information display terminal and a second image produced from information related to the measurement site, and a surveying assistance unit configured to assist measurement performed by the surveying device, by using the terminal display unit.

8 Claims, 10 Drawing Sheets

(58) Field of Classification Search
CPC .... G01C 15/00; G01C 15/002; G01C 21/005; G01B 7/004; G01B 5/004; G06F 3/04817
See application file for complete search history.

(56) References Cited

U.S. PATENT DOCUMENTS

| | | | |
|---|---|---|---|
| 2012/0059720 A1* | 3/2012 | Musabji | G01C 21/3647 |
| | | | 701/527 |
| 2019/0220002 A1* | 7/2019 | Huang | H04N 13/156 |
| 2020/0340811 A1* | 10/2020 | Kumagai | G01S 17/42 |
| 2021/0404808 A1 | 12/2021 | Yasutomi et al. | |
| 2022/0011107 A1 | 1/2022 | Kikuchi | |

FOREIGN PATENT DOCUMENTS

| | | | |
|---|---|---|---|
| JP | 2004309255 A | * | 11/2004 |
| JP | 6301678 B2 | * | 3/2018 |
| JP | 2020-056616 A | | 4/2020 |
| JP | 6721925 B1 | * | 7/2020 |

OTHER PUBLICATIONS

Extended European Search Report mailed Apr. 8, 2024 in connection with European Patent Application No. 23160369.7, 13 pgs.
Partial European Search Report mailed Jul. 27, 2023, in connection with European Patent Application No. 23160369.7, 12 pgs.

* cited by examiner

SURVEYING ASSISTANCE SYSTEM, INFORMATION DISPLAY TERMINAL, SURVEYING ASSISTANCE METHOD, AND STORAGE MEDIUM STORING SURVEYING ASSISTANCE PROGRAM

CROSS-REFERENCE TO RELATED APPLICATIONS

This application claims the benefit of priority to Japanese Patent Application Number 2022-034899, filed Mar. 8, 2022; the disclosure of which is incorporated herein by reference in its entirety.

TECHNICAL FIELD

The present disclosure relates to a surveying assistance system, an information display terminal, a surveying assistance method, and a storage medium storing a surveying assistance program applicable to a system for measuring point clouds in a three-dimensional space.

BACKGROUND

Information and communications technology (ICT) has become more widespread in recent years; ICT is even used in construction work at construction sites. ICT can handle changes in the work environment in the construction industry, such as manpower shortages and recent infection control measures for contagious diseases, and is thus expected to improve work efficiency or contribute to labor saving.

As one technology utilizing ICT, JP 2020-56616 A discloses a system for acquiring three-dimensional data, such as topography data or geographical feature data. This system measures target objects from a plurality of positions using a ground-based three-dimensional scanner device to acquire three-dimensional point cloud data, and shows the point cloud data on a terminal.

SUMMARY

In such a system, there have been few methods to check whether the three-dimensional point cloud data is acquired properly, including a method to check whether the data is evenly acquired when distributed on a planar map, or a method to confirm whether the three-dimensional point cloud data is sufficiently acquired by drawing the point clouds in a virtual space, which simulates a three-dimensional space of the surroundings. The former method could not tell whether the measurement can acquire the minimum amount of the point clouds while measuring on the site, and the latter method requires significant effort to confirm several virtual spaces for a region because there is a limit to the virtual space that computers can draw at one time. Such problems do not allow users to simultaneously scan and check the point cloud data at a site.

An object of the disclosure is to provide, in a system for measuring point clouds in a three-dimensional space, a surveying assistance system, an information display terminal, a surveying assistance method, and a storage medium storing a surveying assistance program, which allow users to scan at a site efficiently.

To achieve the object described above, a surveying assistance system according to an embodiment of the disclosure is a surveying assistance system including an information display terminal and a surveying device configured to measure a point cloud in a three-dimensional space. The surveying assistance system includes a terminal display unit and a surveying assistance unit. The terminal display unit is configured to show a first image of a measurement site captured from a position of the information display terminal and a second image produced from information regarding the measurement site. The surveying assistance unit is configured to assist measurement performed by the surveying device, by using the terminal display unit.

Further, to achieve the object described above, some embodiments provide an information display terminal. The information display terminal includes a terminal display unit and a surveying assistance unit. The terminal display unit is configured to show a first image of a measurement site captured by a terminal imaging unit, and a second image produced from information regarding the measurement site. The surveying assistance unit is configured to assist measurement performed by a surveying device that measures a point cloud in a three-dimensional space, by using the terminal display unit.

Further, to achieve the object described above, some embodiments provide a surveying assistance method for a surveying assistance system including an information display terminal and a surveying device configured to measure a point cloud in a three-dimensional space. The surveying assistance method includes: showing, on a terminal display unit, a first image of a measurement site captured from a position of the information display terminal and a second image produced from information regarding the measurement site, and assisting measurement performed by the surveying device, by using the terminal display unit via a surveying assistance unit.

Furthermore, to achieve the object described above, some embodiments provide a storage medium storing a surveying assistance program for a surveying assistance system including an information display terminal and a surveying device configured to measure a point cloud in a three-dimensional space. The storage medium stores a surveying assistance program for causing a computer to execute: showing, on a terminal display unit, a first image of a measurement site captured from a position of the information display terminal and a second image produced from information regarding the measurement site, and assisting measurement performed by the surveying device, by using the terminal display unit via a surveying assistance unit.

According to the disclosure, scanning at a site can be performed efficiently.

DESCRIPTION OF EMBODIMENTS

Overview

Figure 1:
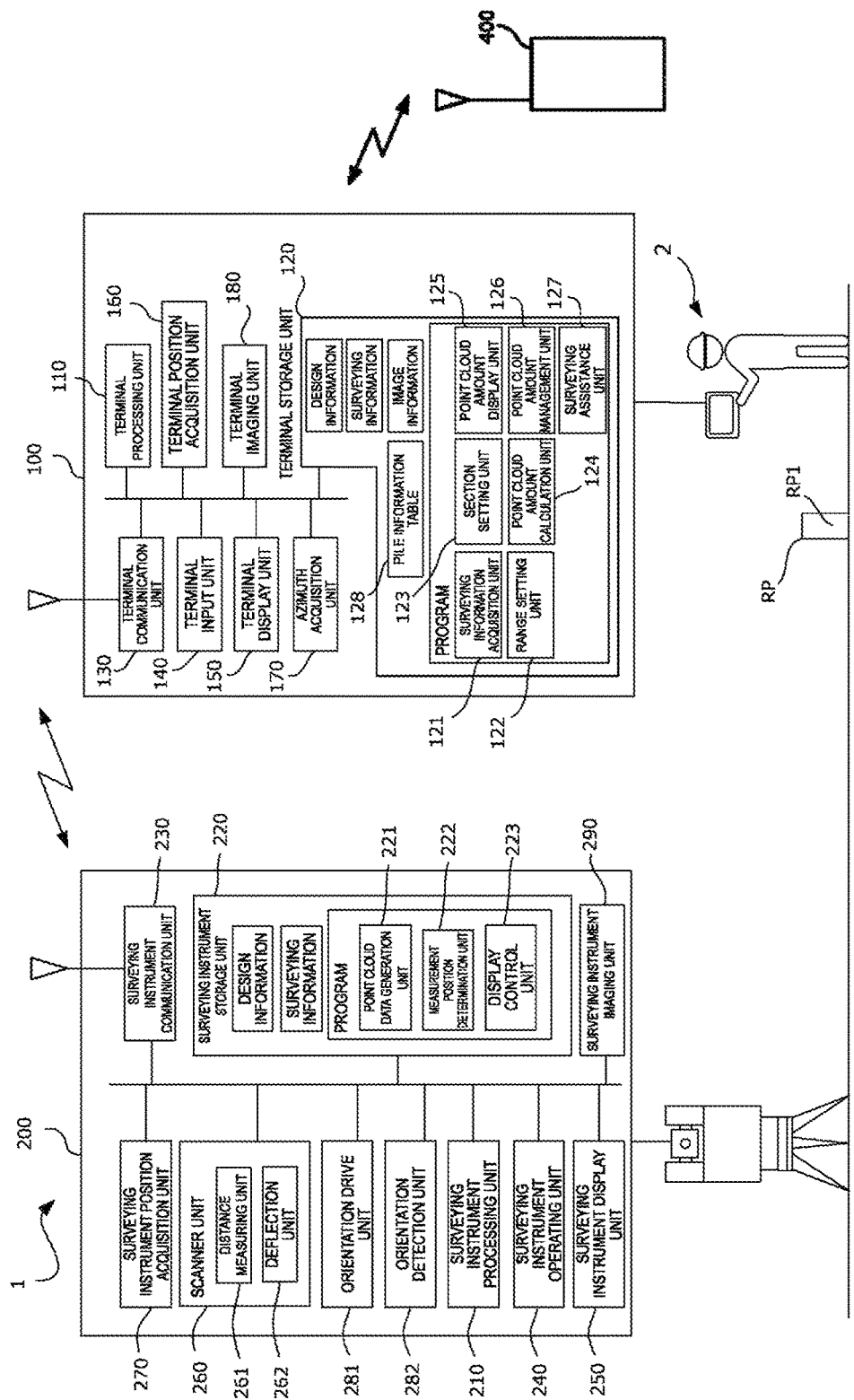
FIG. 1 is a configuration diagram of a surveying system according to an embodiment of the disclosure.

Outdoor construction for civil engineering work sometimes requires confirmation work of the construction site and the surroundings before the construction starts or after each phase of the construction finishes, where the confirmation work is typically done by measuring or scanning with a surveying device such as a three-dimensional scanner, which can acquire three-dimensional data including point clouds (hereinafter also referred to as "point cloud data"). The confirmation work produces a result and output of the construction site, which should be written in a certain format as a report and submitted to an institution, who has required the report. Acquiring point clouds at a site typically requires installing a surveying device and measuring with the surveying device multiple times at different locations in the site. Alternatively, acquiring the point clouds can be done by running a movable vehicle or such movable body, which is equipped with a three-dimensional scanner on, to scan while the vehicle is moving around the site.

An operator should check and confirm the acquisition state of the three-dimensional point cloud data using an information display terminal, typically a smartphone, a tablet, or a personal computer (PC) at hand. The information display terminal shows point clouds and outputs the amount of point clouds by using so-called extended reality (XR) technology, such as augmented reality (AR) or mixed reality (MR) to draw point clouds in a virtual space, which simulates a three-dimensional space. The present embodiment will be described about a system, which combines the drawing of point clouds simulating a three-dimensional space with a still image or a moving image captured at the construction site, to assist the surveying for users.

An embodiment of the disclosure will be described below with reference to the drawings. FIG. 1 is a configuration diagram of a surveying system 1 according to an embodiment of the disclosure.

System Configuration

The surveying system 1 (surveying assistance system) includes an information display terminal 100 used by an operator 2, a surveying device 200, and an external device 400. The operator 2 uses the surveying system 1 to check three-dimensional point cloud data measured and acquired at an outdoor site, such as a civil engineering construction site. The external device 400 includes a communication unit that communicates with the information display terminal 100 in a wired or wireless manner. The external device 400 is, for example, a device other than the information display terminal 100 and the surveying device 200.

The surveying device 200 for measuring and acquiring the three-dimensional point cloud data includes, for example a three-dimensional scanner device and a three-dimensional laser scanner device. The surveying device 200 includes a surveying instrument storage unit 220, a scanner unit 260, an orientation drive unit 281, an orientation detection unit 282, a surveying instrument display unit 250, a surveying instrument operating unit 240, a surveying instrument communication unit 230, a surveying instrument processing unit 210, a surveying instrument position acquisition unit 270, and a surveying instrument imaging unit 290. These components are electrically connected to each other.

The surveying instrument storage unit 220 is a storage device such as a memory or a magnetic disk that stores various design information regarding the site. The design information includes building information modeling (BIM). The design information is not limited to BIM and may include three-dimensional computer-aided design (CAD) data or a pictorial design drawing that is accompanied with the scale of size in the image file.

The scanner unit 260, which is a laser scanner for example, includes a distance measuring unit 261 and a deflection unit 262. The distance measuring unit 261 measures distance by emitting laser light for distance measuring and receiving the light reflected to the distance measuring unit 261. The deflection unit 262 is a mechanism that controls a traveling direction of a laser light for laser scanning. The mechanism includes various physical and electrical deflection mechanisms and typically uses a mirror.

The orientation drive unit 281 is an actuator that rotates the scanner unit 260 in horizontal and vertical directions. By rotating the scanner unit 260, the orientation drive unit 281 can change the orientation of the scanner unit 260.

The orientation detection unit 282 is a rotation angle sensor (encoder) that can detect horizontal and vertical angles of the scanner unit 260 driven by the orientation drive unit 281. The orientation detection unit 282 may additionally include a tilt measuring instrument (tilt sensor) that detects how much the surveying device 200 itself is horizontally or vertically inclined from the default position. The orientation detection unit 282 can detect the orientation of the scanner unit 260.

The surveying instrument display unit 250 is a display device that can show various information, including a virtual space based on design information stored in the surveying instrument storage unit 220, a measurement result acquired by the scanner unit 260, and an analysis result acquired by the surveying instrument processing unit 210.

The surveying instrument operating unit 240 is a unit that allows users to configure and operate the scanner unit 260, the orientation drive unit 281 and other units for the measuring, including to change settings of the scanner unit 260 and to control driving of the orientation drive unit 281. The surveying instrument operating unit 240 may be implemented by, for example, a set of physical buttons or a touch screen integrated with the surveying instrument display unit 250.

The surveying instrument communication unit 230 is a communication device that can at least mutually communicate with various information terminals. The surveying instrument communication unit 230 may connect to and communicate with a network such as the Internet, or the information display terminal 100 in a wireless or wired manner.

The surveying instrument position acquisition unit 270 acquires position information of the surveying device 200 when the surveying device 200 is stopped and moving. The surveying instrument position acquisition unit 270, with the surveying device 200 installed at various installation positions, can determine its own position by surveying a target such as a retro-reflective prism installed at a known location. Alternatively, the surveying instrument position acquisition unit 270 may be implemented by a global navigation satellite system (GNSS) receiver. The position information acquired by the surveying instrument position acquisition unit 270 is position information in local coordinates of the surveying device 200. The local coordinates are coordinates based on design information of a target site to be surveyed using point clouds.

The surveying instrument imaging unit 290 is implemented by, for example, a camera that can capture an image, which can be either or both of a moving image or a still image. The surveying instrument imaging unit 290, which can preferably capture a panoramic image that is longer in the horizontal direction. To capture a panoramic image, the surveying instrument imaging unit 290 may be implemented by an omnidirectional camera that can capture a 360-degree image in the horizontal direction at one shot, or a camera with a rotating unit for surveying instrument imaging unit 290 to turn full circle by 360 degrees capturing around several images to make a panoramic image. The surveying instrument imaging unit 290 also transmits the captured image as image information to the information display terminal 100 via the surveying instrument communication unit 230.

The surveying instrument processing unit 210, which is implemented by a central processing device that performs various types of control in the surveying device 200, executes functions of the following units according to programs stored in the surveying instrument storage unit 220: a point cloud data generation unit 221, a measurement position determination unit 222, and a display control unit 223.

The display control unit 223 produces three-dimensional virtual space display information of a construction site on the basis of the design information stored in the surveying instrument storage unit 220, and show, on the surveying instrument display unit 250, various information including the point cloud data on the virtual space and a measurement position, which has been calculated and determined by the measurement position determination unit 222.

The point cloud data generation unit 221 produces the three-dimensional point cloud data which includes distance information from respective distance measurement positions measured by the scanner unit 260, and the horizontal and vertical angles detected by the orientation detection unit 282.

The measurement position determination unit 222 determines the measurement position of the three-dimensional point cloud data produced by the point cloud data generation unit 221.

The surveying device 200 may have other surveying functions. For example, the surveying device 200 may have a three-dimensional scanner function on top of a total station (TS). Further, the surveying device 200 may have a movement mechanism to autonomously travel on a predetermined route, or to allow a user to remotely control to travel. The movement mechanisms can be implemented by a vehicle, a robot, and an unmanned aerial vehicle (UAV). The vehicle includes heavy equipment that is typically used in the construction site.

The information display terminal 100 includes, for example, a smartphone, a feature phone, a tablet, a handheld computer device (e.g., a personal digital assistant (PDA)), and a wearable terminal (e.g., an eyeglass-type device or a watch-type device). The information display terminal 100 according to the present embodiment may be a general-purpose terminal on which application software has been installed to work for the purpose. The information display terminal 100 includes a terminal display unit 150, and allows the operator 2 to easily bring and carry in the construction site, and to view various information shown on the terminal display unit 150 while carrying the information display terminal 100 hands-free or while holding the information display terminal 100 with one hand. The information display terminal 100 may include an internal power supply, such as a battery, which keeps running by itself for a certain period of time without connecting to an external power supply.

The information display terminal 100 includes a terminal communication unit 130, a terminal storage unit 120, a terminal processing unit 110, a terminal input unit 140, the terminal display unit 150, a terminal position acquisition unit 160, an azimuth acquisition unit 170 (terminal azimuth acquisition unit), and a terminal imaging unit 180.

The terminal processing unit 110 executes functions and/or methods implemented by codes or commands included in the programs stored in the terminal storage unit 120 (not illustrated). The terminal processing unit 110 includes, for example, a central processing unit (CPU), a microprocessor unit (MPU), a graphics processing unit (GPU), a microprocessor, a processor core, a multiprocessor, an application specific integrated circuit (ASIC), and a field-programmable gate array (FPGA). The terminal processing unit 110 may be an integrated circuit or another type of circuit forming a logic circuit or a dedicated circuit that executes the processes disclosed in each embodiment. These circuits may be implemented by one or more integrated circuits, and one integrated circuit may execute the plurality of processes described in each embodiment. Although not illustrated, the terminal processing unit 110 may include a main storage unit that temporarily stores a program read from the terminal storage unit 120 and provides a workspace for the terminal processing unit 110.

The terminal communication unit 130 can communicate with the surveying instrument communication unit 230 of the surveying device 200, to receive the three-dimensional point cloud data that has been measured and calculated by the surveying device 200, the position information of the surveying device 200, and the image information that has been captured by the surveying instrument imaging unit 290. Either the surveying device 200 or the information display terminal 100 may calculate the measurement position information of the three-dimensional point cloud data. The communication may be conducted by either of a wired or wireless manner, and any communication protocol may be used so that mutual communication can be established.

The terminal input unit 140 is implemented by any one or a combination of devices configured to receive input from a user, that is, the operator 2 and transmit information of the input to the terminal processing unit 110. The terminal input unit 140 includes, for example, a hardware input unit such as buttons, as well as a software input unit shown on a display unit such as a touch panel, a remote controller, and an audio input unit, such as a microphone.

The terminal display unit 150 is implemented by any one or a combination of devices that can show a screen image. The terminal display unit 150 includes, for example, a liquid crystal display (LCD) or an organic light-emitting diode (OLED) display in the form of a flat display, a curved display, a folding screen provided in a foldable terminal, and a head-mounted display, or a device that can project a display onto an object using a small projector.

The terminal position acquisition unit 160 is implemented by, for example, a GNSS receiver. The terminal position acquisition unit 160 acquires the position of the information display terminal 100 when the information display terminal 100 is stopped and moving. The position information acquired by the terminal position acquisition unit 160 is in the global coordinates of the information display terminal 100.

The terminal imaging unit 180 is implemented by, for example, a camera that captures an image. The terminal imaging unit 180 is provided on a back side of the information display terminal 100, opposite to the terminal display unit 150. The terminal imaging unit 180 shows a captured image on the terminal display unit 150. The image captured by the terminal imaging unit 180 may include a moving image and a still image.

The azimuth acquisition unit 170 is implemented by, for example, an electronic compass. The azimuth acquisition unit 170 detects geomagnetism with a magnetic sensor to acquire the azimuth of the information display terminal 100. Accordingly, the azimuth acquisition unit 170 can acquire the azimuth of an imaging direction of the terminal imaging unit 180, that is, the azimuth of a direction at which the operator 2 looks through the terminal display unit 150.

The terminal storage unit 120 stores various programs and data required by the surveying assistance program and other programs. The terminal storage unit 120 can also store the surveying information (such as three-dimensional point cloud data, and position information of the surveying device 200) received by the terminal communication unit 130. For example, the terminal storage unit 120 stores the design information including information regarding the land used at the construction site (such as altitude of the land) and the design information for slopes to make on the land. The terminal storage unit 120 is a storage device or a storage medium, such as a hard disk drive (HDD), a solid state drive (SSD), and a flash memory.

The design information includes design drawings necessary for construction work. The term "construction" here refers to any construction for a structure including a building, a road, a railway, a tunnel, a bridge, a ditch, a waterway, and a revetment. The design drawings may include a plan view, a longitudinal cross-sectional view, and a transverse cross-sectional view, and these views further include linear data, point data, and the positions, coordinates, and altitudes of the points and line sections.

Figure 2:
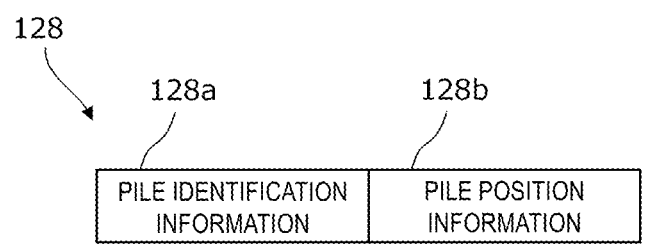
FIG. 2 is a configuration diagram of a pile information table.

Additionally, the terminal storage unit 120 stores a pile information table 128. FIG. 2 illustrates the pile information table 128 storing pile identification information 128a and pile position information 128b in association with each other. The pile information table 128 can also store data for multiple sets of the pile identification information 128a and the pile position information 128b. As illustrated in FIG. 1, the pile identification information 128a is for identifying, for example, a reference point RP as a target to measure, which has been set at a site. Specifically, the pile identification information 128a corresponds to an identifier RP1 of a pile provided as the reference point RP. The identifier RP1 of the present embodiment is, for example, a character, such as a pile number shown on the pile, or a passive tag (e.g., a radio frequency identification (RFID) tag) attached to the pile.

The terminal storage unit 120 stores application software programs that implement various functions including a surveying information acquisition unit 121, a range setting unit 122, a section setting unit 123, a point cloud amount calculation unit 124, a point cloud amount display unit 125, a point cloud amount management unit 126, and a surveying assistance unit 127. The terminal storage unit 120 may also store a program or programs having the functions of the point cloud data generation unit 221 and the measurement position determination unit 222. The terminal processing unit 110 will implement the functions of the point cloud data generation unit 221 and the measurement position determination unit 222.

The surveying information acquisition unit 121 acquires, from the surveying device 200, the surveying information including the point cloud data associated with the position information. The point cloud data generation unit 221 of the surveying device 200 produces the three-dimensional point cloud data through measurement conducted by the scanner unit 260. The measurement position determination unit 222 assigns and associates position information to each point cloud of the three-dimensional point cloud data. The surveying information acquisition unit 121 acquires the point cloud data associated with the position information through communication between the surveying instrument communication unit 230 and the terminal communication unit 130.

The range setting unit 122 sets a display range of the point cloud. The range setting unit 122 allows a user to designate a range or an area on a map (in local coordinates) of the construction site to set a display range to manage the amount of point clouds. This setting can be done by the operator 2 using the information display terminal 100 with the terminal input unit 140, or by application software for managing the site, such as software installed and run on a predetermined information processing management server, which can be accessible from the information display terminal 100 through communication by the terminal communication unit 130. Alternatively, the setting can be done by the range setting unit 122 itself reading managed area information included in the design information or other information stored in the terminal storage unit 120 to designate the display range. The designation for the display range of the point cloud is by, for example, indicating a boundary line on the map, which defines the inside and outside of the range on the map. When the display range is set, the terminal display unit 150 shows the set display range on the map. At this time, the terminal display unit 150 can also show the position information of the display range on the map or the design drawings in association with the display range.

The section setting unit 123 divides the display range into predetermined unit sections. The section setting unit 123 divides the display range, which has been set by the range setting unit 122, into a plurality of unit section groups, in which each unit section has a certain, predetermined area of size (also referred to as "unit area sections"). The unit sections are typically square sections having the same area of size, that is, so-called grid units (refer to FIG. 5 and other drawings). The unit section is not limited to the square shape or the grid unit, and may be any shape (or section) that can divide the display range into a plurality of consecutive unit sections without gaps, such as a hexagon or triangle shape. The size of each unit section can be freely configured by the user. Each unit section intersecting a boundary line may have a shape with a portion that protrudes beyond the boundary line or a shape of a portion that is cut out partly from the grid shape so as not to protrude beyond the boundary line. Each unit section includes position information, using the position information on the map provided to the display range.

The point cloud amount calculation unit 124 calculates the amount of point clouds included in the space of each unit section. The point cloud amount calculation unit 124 can calculate the amount of point clouds in the space of each unit section by comparing the position information of each unit section with position information associated with the acquired three-dimensional point cloud data. The "amount of point clouds" is a quantitative indicator of point clouds, and is not limited to the number of point clouds. The "amount of point clouds" include the number of point clouds, the number of point clouds per unit area, the number of point clouds per unit volume, the average value of altitude values of point clouds included in a unit section, or other statistical values.

Further, the point cloud amount calculation unit 124 may calculate from point clouds which satisfy one of predetermined conditions. The point cloud amount calculation unit 124 may use only point clouds acquired within a predetermined distance from the surveying device 200 for the calculation. For example, the point cloud amount calculation unit 124 may use only point clouds within a 30-$m$ radius of the surveying device 200. The point cloud amount calculation unit 124 has set this predetermined distance by using, for example, one of predetermined testing methods to calculate a measurement distance in which the surveying device 200 at the site can measure. The predetermined testing methods include an accuracy confirmation test of comparing a distance between two distances, where one of which has been acquired from a measurement result using the surveying device 200 to measure a distance between two or more known points, and another of which has been acquired from a measurement result using a total station to measure the same distance, and then checking whether the difference can fall within a predetermined range of length. Furthermore, the measurement accuracy of the surveying device 200 typically decreases as the incident angle of the laser light on the road surface decreases. Accordingly, the surveying device 200 may be configured to use only point clouds measured with a predetermined incident angle or greater for the calculation.

The point cloud amount calculation unit 124 may calculate the amount of point clouds for each unit section from point clouds existing in a space, which are at a certain height within a predetermined altitude range. More specifically, the point cloud amount calculation unit 124 configures the upper and lower limits of the altitude to calculate the amount of point clouds in a space of a unit section within the altitude range between these upper and lower limit values.

The point cloud amount calculation unit 124 may further calculate a value of an indicator regarding sufficiency to the requirement, such as a sufficiency rate, of the amount of point clouds in the display range or the unit section. The point cloud amount calculation unit 124 can read the required amount of the point clouds per unit section included and stored as the design information in the terminal storage unit 120, compare the required amount of the point clouds with the actually calculated amount of point clouds, and calculate a value of an indicator of sufficiency to the required amount of the point clouds. The indicator of sufficiency to the required amount of the point clouds may include a sufficiency rate (e.g., "80% sufficient") or an insufficiency rate (e.g., "20% insufficient") for the required amount of the point clouds. Additionally, the indicator may be represented by a number, a rank such as high, medium, or low, or by sufficiency or insufficiency determined by comparing with a predetermined value of threshold. The point cloud amount calculation unit 124 may calculate the sufficiency rate or other indicators for all unit sections, and then partially calculate a sufficiency rate or other indicators of the display range. The sufficiency rate or other indicators of the display range may include an average value of the sufficiency rates or other indicators of all unit sections, or a value acquired by dividing the number of unit sections that satisfies a required sufficiency rate or other indicators by the total number of unit sections.

The point cloud amount calculation unit 124 may further use the position of the surveying device 200 to calculate an acquirable range of point clouds and predicted amount of point clouds that can be acquired from the surveying of the point cloud at that position. More specifically, the operator 2 first installs the surveying device 200 at a position within the display range, and then acquires the position information of the surveying device 200 as described above as the task of acquiring point clouds. Then, the point cloud amount calculation unit 124 estimates the amount in volume of the three-dimensional point cloud data that can be acquired from point clouds around the surveying device 200. The point cloud amount calculation unit 124 can acquire the range of acquirable point clouds and the amount in volume of point clouds from information regarding performance of the surveying device 200 stored in advance in the terminal storage unit 120, and determine the range of the point clouds that can be acquired and calculate the number of point clouds around the position where the surveying device 200 is installed.

The point cloud amount calculation unit 124 may further calculate the sum when, at the time of calculating the predicted value of the amount of point clouds, an overlapping unit section already having an existing value for the amount of point clouds calculated on the basis of the surveying information exists within the acquirable range. The point cloud amount calculation unit 124 calculates the sum by adding up the already calculated amount of point clouds and the predicted amount of point clouds for the overlapping unit section. The point cloud amount calculation unit 124 calls, as the existing value, the surveying information of the three-dimensional point cloud data already measured from the terminal storage unit 120. When there is a region where a measurement range of the predicted value calculated as described above overlaps the measurement range of an existing value, the point cloud amount calculation unit 124 adds the existing value and the predicted value for that unit section, that is, the overlapped unit section related to the region to calculate the sum indicating an estimation of the increase in the amount of point clouds in future surveying.

The point cloud amount calculation unit 124 may also calculate the sum for overlapping unit sections in terms of measurement range described above not only by adding the existing value and the predicted value, but also by adding already measured existing value and the existing value.

The point cloud amount display unit 125 allows the information display terminal 100 to show, for each unit section within the display range, the calculated amount of point clouds in each unit section. When the amount of point clouds is corresponding to either of the number of point clouds, the number of point clouds per unit area, and the number of point clouds per unit volume, the point cloud amount display unit 125 will allow the terminal display unit 150 to show the calculated values as described above as follows: the amount of point clouds, the predicted value of the amount of point clouds, or the sum acquired by adding the predicted value to the existing value of the already calculated amount of point clouds, respectively described above, in various manners to show depending on the level of the amount of point clouds to allow users to easily understand the calculated values. Most typically, the amount of point clouds may be shown in a different color depending on the level of the amount. For example, the display may have a color distribution in which a unit section having a large amount of point clouds is shown in red, a unit section having a small amount of point clouds is shown in blue, and those in between are shown in yellow. When the amount of point clouds is corresponding to either of an altitude value of the point cloud, an average value of the altitude values of the point clouds in a unit section, and statistical values thereof, the color distribution may be such that a unit section having a high altitude value is shown in red, a unit section having a low altitude value is shown in blue, and those in between are shown in yellow. The display manner of the amount of point clouds is not limited to the above color coding.

The point cloud amount display unit 125 may further have one or more of the following exemplary functions: showing the amount of point clouds in a predetermined altitude range for each unit section, showing an indicator of sufficiency to the required amount of the point clouds in a display range or unit section, showing the amount of point clouds in accordance with the predicted value for each unit section, showing an amount of point clouds according to the sum acquired by adding the predicted value to the already calculated existing value, and showing the amount of point clouds according to the sum acquired by adding existing values. The manner of showing the indicator so as to indicate the level of the amount of point clouds, as in the color-coded display described above, can also be a manner of showing the following values: the amount of point clouds in the predetermined altitude range for each unit section, an indicator of sufficiency to the required amount of the point clouds in a display range or unit section, showing the amount of point clouds according to a predicted value for each section, or showing the amount of point clouds according to the sum acquired by adding the predicted value to the already calculated existing value.

Further, the point cloud amount display unit 125 can transform and/or adjust the coordinates of the position information acquired by the terminal position acquisition unit 160 into the local coordinates of the point cloud to show the position of the information display terminal 100 in the local coordinates on the terminal display unit 150. The local coordinates of the point cloud include local coordinates in the display range. Transforming and/or adjusting the global coordinates acquired by the terminal position acquisition unit 160 into the local coordinates of the target site to be surveyed includes, for example, a method in which the operator 2 brings the information display terminal 100 to a known point on the local coordinates to perform a predetermined operation for the transformation on the terminal input unit 140. When the operator 2 performs this predetermined operation, the point cloud amount display unit 125 associates a known point on the local coordinates with the position information acquired by the terminal position acquisition unit 160, and then transforms or adjusts these coordinates to the local coordinates. The known point can be, for example, a global reference point or a position which has been measured by surveying with a total station or a GSNN, which should include the position information on the global coordinates.

Furthermore, the point cloud amount display unit 125 can produce computer graphics (CG) to show as so-called an X-reality or cross-reality (XR) image including an augmented-reality image (AR image) or a mixed-reality image (MR image), which includes an image captured by the terminal imaging unit 180 (as a first image) at the position of the information display terminal 100 in the local coordinates and from the captured direction of the terminal imaging unit 180, and an image produced to indicate the unit sections and the measurement site (as a second image), to three-dimensionally superimpose the second image on the first image. The information regarding the measurement site, which is superimposed on the image captured by the terminal imaging unit 180 to show in each unit section, is not limited to the unit sections and the amount of point clouds. Information including the indicator of sufficiency to the required amount of the point clouds calculated by the point cloud amount calculation unit 124, and the range and the predicted amount of point clouds acquired from surveying point clouds may be shown for each unit section. The information regarding the measurement site may also include a position of the surveying device 200 currently being installed, a position of the surveying device 200 that was installed in the past, a position of the known point, and a position of the movable body whose position has been detected. The positions of the surveying device 200, the position of the known point, the position of the movable body, and other positions are preferably indicated by icon displays so as to allow the operator 2 to easily identify them.

Showing point clouds that have been scanned successfully and ones that have not been scanned yet, on the terminal display unit 150 by the function described above of the point cloud amount display unit 125 allows the operator 2 to easily determine to re-scan the place that has not been scanned properly as the place shows a smaller account of point clouds (e.g., a place showing a low density of point clouds because of many omissions in scanning).

Further, the information display terminal 100 can make an instruction to measure point clouds, via the terminal input unit 140, to the surveying device 200, which is shown on the image at a position thereof. With the instruction to the terminal input unit 140 of the information display terminal 100 input by the operator 2, the information display terminal 100 determines the surveying device 200, shown on the terminal display unit 150, and sets conditions for the measurement of the point clouds to allow the device to execute the measurement. The conditions set for the measurement of the point clouds include, for example, a range of angles to measure in a horizontal and/or vertical way, and a measurement distance for defining the range to scan. At this time, the point cloud amount display unit 125 can be showing, on the terminal display unit 150, images that are being captured by the surveying instrument imaging unit 290 of the surveying device 200 that are in operation. Based on the images captured by the surveying instrument imaging unit 290, the operator 2 can specify the orientation of the surveying device 200 and set the conditions for the measurement.

The surveying device 200 measures point clouds in a range in accordance with the conditions of the measurement set by the operator 2 as described above, or measures point clouds within the display range of the point cloud that has been set by the range setting unit 122. Specifically, the point cloud amount display unit 125 uses the direction of the surveying device 200, that has been determined on the basis of the current position information of the surveying device 200 and the image information captured by the surveying instrument imaging unit 290, to estimate a range that the surveying device 200 can measure. Then, the point cloud amount display unit 125 transmits an instruction to the surveying device 200 to measure point clouds in the range of the display range set by the range setting unit 122 of the information display terminal 100.

The point cloud amount management unit 126 allows the information display terminal 100 to show information indicating insufficiency of the amount of point clouds when the unit sections of the display range do not satisfy the predetermined required amount of the point clouds. The point cloud amount management unit 126, as described above, uses the predetermined threshold value for the amount of point clouds, which has been stored in the terminal storage unit 120, to determine whether the amount of point clouds is sufficient or insufficient in each unit section, and then causes the terminal display unit 150 of the information display terminal 100 to show information indicating insufficiency of the insufficient unit section so that the operator 2 can recognize the information as an alert. When the amount of point clouds is equal to either of the altitude value of the point cloud, the average value of the altitude values, and the statistical values thereof, the point cloud amount management unit 126 may determine, for each unit section, whether the amount of point clouds is larger or smaller than the reference value by comparing with another reference value of three-dimensional data, such as a design altitude value in the design information that is subject to the comparison, and then show a unit section that has deviation from the reference to the operator 2.

Further, the point cloud amount management unit 126 calculates accuracy of the installation position of the surveying device 200 from point cloud data measured from a plurality of installation positions and causes the information display terminal 100 to show information regarding the accuracy of the installation. The point cloud amount management unit 126 calculates a value of a comparison indicator such as an average altitude or a median value for a plurality of point cloud data for each unit section including a plurality of point cloud data (overlapped point cloud data) that has been measured from different directions, and uses the difference between the comparison indicators to calculate the accuracy of the installation.

For example, given that point cloud data that has been measured from at least three installation positions (first point cloud data Da, second point cloud data Db, and third point cloud data Dc) exist in the same unit section, differences (Ea-Eb, Ea-Ec, Eb-Ec) between average altitudes (Ea, Eb, Ec), which have been calculated from the point cloud data, are calculated as the accuracies of installation positions, respectively. If these difference are less than a predetermined value, the point cloud amount management unit 126 determines that the installation has no problem in terms of accuracy. On the other hand, if any two differences exceed the predetermined value, the point cloud amount management unit 126 determines that the installation has a problem. For example, when the difference (Eb-Ec) that is not related to the first point cloud data Da does not exceed the predetermined value and both the differences (Ea-Eb) and (Ea-Ec) that are related to the first point cloud data Da exceed the predetermined value, the point cloud amount management unit 126 determines that the installation at the position where the first point cloud data Da has been measured has a problem.

Then, the point cloud amount management unit 126 causes the information display terminal 100 to show, as the information regarding the accuracy of installation positions, the difference between the comparison indicators described above for each unit section. For example, the point cloud amount management unit 126 may show a unit section for which a difference between the comparison indicators is less than a predetermined value in blue, a unit section for which a difference between the comparison indicators is greater than or equal to the predetermined value in red, and a unit section with no point cloud data measured from at least three points in the same unit section in white, or may show the numerical values of the differences between the comparison indicators in each unit section. The accuracy of installation positions may be shown together with the amount of point clouds described above, or may be shown in another screen image. Further, the point cloud amount management unit 126 may, for a unit section determined that has a problem, show an alert for verifying details including the surveying position and the installation method of the surveying device 200 used to measure the point cloud data and requesting re-measurement. The point cloud amount management unit 126 need not necessarily calculate the accuracy of the installation for each unit section having overlapping point cloud data, and may calculate and show the accuracy of the installation position for an entire portion having overlapping point cloud data. This alert may indicate a percentage of the unit sections for which the difference from the comparison indicator of other point cloud data is greater than or equal to a predetermined value.

The surveying assistance unit 127 performs a surveying assistance function to facilitate the measurement with the surveying device 200 by using the display function of the terminal display unit 150 that shows the first image of a measurement site captured from the position of the information display terminal 100 and the second image produced from information regarding the measurement site, by using CG or other methods. The terminal display unit 150 shows information regarding surveying assistance in a manner of a combined image, such as an AR image, with the first image and the second image. The second image may include an image of topography and landscaping based on the point cloud data acquired by the surveying device 200. The terminal display unit 150 may show the topography and landscaping that has been measured by the information display terminal 100. The information display terminal 100 may detect the topography and landscaping by using a light detection and ranging (Lidar) sensor and an inertial measurement unit (IMU). Alternatively, the information display terminal 100 may detect the topography and landscaping by using a device with a function of simultaneous localization and mapping (SLAM; also referred to as visual SLAM or structure from motion or shape from motion (SfM)) using an image. Accordingly, the information display terminal 100 can allow the operator 2 to easily identify topography and landscaping even in a region for which the amount of point clouds acquired by the surveying device 200 is insufficient. The surveying assistance unit 127 may, when showing the topographical image as the first image on the terminal display unit 150, show a two-dimensional (2D) map as the second image on the ground. Alternatively, the surveying assistance unit 127 may show a 2D map of the target area on the terminal display unit 150. As a result, the surveying assistance unit 127 can provide the operator 2 with information regarding the topography and landscaping of the target area and other sites to be measured.

The surveying assistance unit 127 has a surveying assistance function including a display function for a pile point position, a display function for a danger zone, a display function for a blind spot, a position correction function, a guidance function, a scan instruction function, a warning function, and a linkage function.

The display function for a pile point position implements a function of showing a position RP of the pile on the terminal display unit 150. The terminal display unit 150 shows an icon image to indicate a pile point as the second image at the actual pile position RP within the range of the first image shown on the terminal display unit 150.

The display function for a danger zone is a function of indicating a danger zone in the measurement site shown on the terminal display unit 150. The terminal display unit 150 shows, as the second image representing information regarding the measurement site, an image indicating a danger zone together with the first image acquired by imaging. The danger zone includes, for example, one or a combination of (1) a work zone of heavy equipment or other equipment in operation, acquired from an another system outside the surveying system 1 or the external device 400 (e.g., a device connected via the Internet), (2) a work zone configured from a workplace list of the day, which has been input from an external network or other terminals, (3) an unstable zone recognized from scanned data which has been acquired from the surveying device 200 (e.g., an inclined zone recognized from point cloud data), and (4) a zone having a high (or increased) degree of danger at the site as determined on the basis of weather information (e.g., a zone including land loosened by rainfall). Recognizing a danger zone and showing the danger zone on the terminal display unit 150 in this way allows the operator 2 to avoid the danger zone from the route to move. Further, a recommended route calculated by a guidance function described below in detail can be shown on the information display terminal 100, where a route avoiding the danger zone can be shown as the recommended route.

The display function for a blind spot is a function of showing information regarding a measurement site to indicate a spot that is hard to see from the position of the information display terminal 100 currently on the move. The terminal display unit 150 shows, as the second image, information regarding the measurement site in a blind spot in the first image. The terminal display unit 150 can show, for example, one or more of a reference point position outside of a viewing range, a boundary position of a work area, and a position of a vehicle, such as heavy equipment, located in the shadow of an embankment or other structure.

The position correction function is a function of correcting the position information of the information display terminal 100. An example will now be described that the information display terminal 100 uses known information regarding a position of a pile to correct the position information. The information display terminal 100 reads the identifier RP1 from the pile installed at the measurement site, and uses the position information of the pile indicated by the pile position information 128b corresponding to the pile identification information 128a associated with the identifier RP1 to correct the position information of the information display terminal 100.

The information display terminal 100 uses the terminal imaging unit 180 to capture an image of the character on the pile shown or marked as the identifier RP1, and automatically recognizes the pile as a reference point by using a character recognition program. The pile information acquisition function matches the coordinate information acquired by the terminal position acquisition unit 160, exemplified by the GNSS receiver of the information display terminal 100 or another device, with the coordinate information of the site being the measurement site. The information display terminal 100 can read the identifiers RP1 of a plurality of (e.g., two or more) piles and match the coordinate information acquired by the terminal position acquisition unit 160 and the coordinate information at the site a plurality of times (e.g., two or more times), thereby adjusting the rotation angle between the coordinate information in the terminal position acquisition unit 160 and the coordinate information at the site. The position correction function transforms the coordinates of the position information based on latitude and longitude to those of the position information based on site coordinates. Subsequently, the information display terminal 100 aligns the site coordinates and the rotation (or bearing) by an internal electronic compass. The information display terminal 100 may show visual information by showing information regarding positional accuracy on the terminal display unit 150. Thus, the position correction function corrects the position information on the information display terminal 100 by the reference point based on the pile position information.

The guidance function is a function by which the surveying assistance unit 127 guides movement of the information display terminal 100 to a selected location of the measurement site through an appropriate route. When the operator 2 at the plot of the measurement site is with the information display terminal 100, the guidance function can guide the movement of the operator 2 holding the information display terminal 100.

The point cloud amount display unit 125 shows, as the second image on the terminal display unit 150 of the information display terminal 100, the amount of point clouds for each of unit sections, the unit sections being acquired by dividing the display range of the surveying information in the imaging range of the terminal imaging unit 180 of the information display terminal 100. When the information display terminal 100 specifies the movement destination of the operator 2, the information display terminal 100 shows the recommended route from the current position of the information display terminal 100 to a target position as the second image shown on the terminal display unit 150. The target position in the present embodiment is the position of the movement destination of the operator 2, and may be a position where the operator 2 is scheduled to work next. The movement destination may be specified by the operator 2 inputting a destination into the terminal input unit 140, being automatically specified when the surveying device 200 ends the current surveying on the basis of a preset procedure such as a scan plan to be described below, or another method.

The information display terminal 100 may acquire a surveying scan plan, which has been set in advance in the terminal storage unit 120, the surveying instrument storage unit 220, or a storage unit of the external device 400, to determine the movement destination of the information display terminal 100 on the basis of the scan plan, and show a recommended route on the terminal display unit 150. The scan plan can have been set, by using already acquired point cloud data (topographical data) or known topographical data, to a route that facilitates efficient surveying with a small number of installed surveying device 200 or a small number of moving surveying devices 200 in the range of a scheduled surveying task or a current surveying task (display range DA described below, for example), based on acquired point cloud data (topographical data) or known topographical data. However, the content of the scan plan is not limited to the above example.

The information display terminal 100 may also allow the operator 2 to select an icon image of a pile point, and then show a recommended route from the current position of the information display terminal 100 to the position of the selected pile.

When the position correction function corrects the position of the information display terminal 100, the position information of the information display terminal 100 acquired using the GNSS and the compass matches the coordinate system of the site of the measurement site. To show the recommended route, for example, the terminal display unit 150 shows the next potential scan position as overview information by combining the first image and the second image in an AR image. The surveying assistance unit 127 can show a route having minimal undulation on the terminal display unit 150 as a recommended route based on the already scanned point cloud data. The surveying assistance unit 127 may also show a plurality of potential routes (e.g., recommended routes) that can facilitate efficient movement. The operator 2 can select one route from the plurality of recommended routes, and the surveying assistance unit 127 can allow the terminal display unit 150 to show the selected route selected as a route to be followed next. As an example, the route is shown on the screen image of the terminal display unit 150 as an arrow extending from the current position of the information display terminal 100 to the position planned or selected for scanning. The terminal display unit 150 may show the distance from the current position to the target position. Thus, the surveying assistance unit 127 has a guidance function of showing a recommended route from the current position to the target position to provide guidance on the next installation position of the surveying device 200.

The warning function is a function of issuing a warning to the operator 2 when an inappropriate area is selected as a scan instruction for the surveying device 200. The terminal display unit 150 shows a work management area. The terminal display unit 150 shows a warning (alert) when an area beyond the managed area is selected as the scan instruction, for example. The warning function may issue a warning by another output method, such as sound output using a speaker.

The linkage function is a function by which the information display terminal 100 communicates and links with a device installed in another location (e.g., the external device 400 such as a device installed in an office or other locations), via an external network such as a cloud network. The linkage function is, for example, the information display terminal 100 showing an instruction received remotely from the external device 400. The instruction is, for example, an instruction to show a drawing on the external device 400 on the terminal display unit 150. The information display terminal 100 can show on the terminal display unit 150 an image such as an image input to the external device 400, an image captured by the external device 400, an image drawn or produced by the external device 400, or an image received from the information display terminal 100 to share the image with the operator 2 at the site.

Alternatively, the external device 400 may show the display screen of the terminal display unit 150 (e.g., a partial or entire duplicate of the display screen) on its own display unit. With this configuration, a drawing input using the external device 400 sharing the first and second images with the information display terminal 100 can affect drawing content of the second image on the terminal display unit 150 of the information display terminal 100.

The content shown on the terminal display unit 150 is, for example, (1) content acquired by sharing a three-dimensional image captured by the terminal imaging unit 180 or the external device 400 on the screen image of a PC in an office or other location and drawing an illustration or rough sketch on that screen image, or (2) content acquired by sharing a map shown in two dimensions on the screen image of a PC in an office or other location and drawing an illustration or rough sketch on that screen image. The terminal display unit 150 shows this display content as an AR image. In the case of the display content (2), the terminal display unit 150 also allows the operator 2 to confirm display content input from the external device 400 on a 2D map.

The surveying system 1 described above includes the information display terminal 100 and the surveying device 200 that measures point clouds in a three-dimensional space, and has a measurement assistance function performed by the surveying assistance unit 127. The surveying system 1 functions as a surveying assistance system. The surveying assistance system may have a function other than the surveying assistance function. Further, the surveying assistance system may assist some surveying work processes or may assist a series of surveying work processes.

Processing Flow

Figure 3:
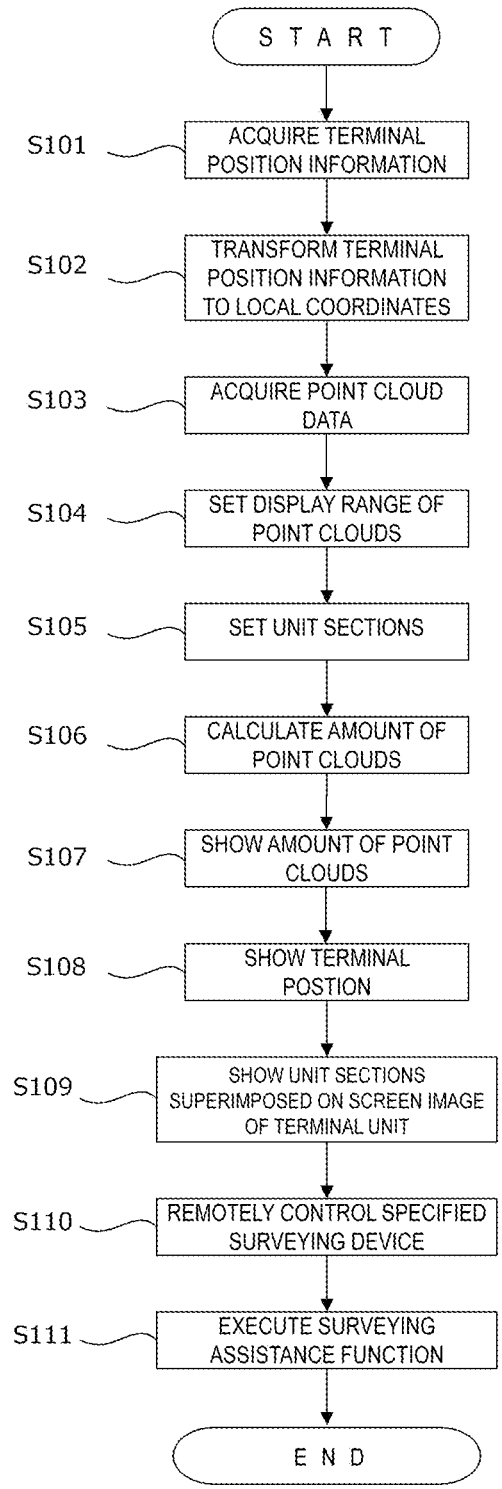
FIG. 3 is a flowchart illustrating a flow of processing.

FIG. 3 is a flowchart illustrating a processing flow of a method and a program using the surveying system 1 according to an embodiment of the disclosure.

First, in step S101, the terminal position acquisition unit 160 acquires the position information of the information display terminal 100.

In step S102, the point cloud amount display unit 125 transforms or adjusts the coordinates of the position information of the information display terminal 100, which has been acquired in step S101 to local coordinates including the display range of the point cloud.

In step S103, the surveying information acquisition unit 121 acquires the surveying information including the point cloud data associated with the position information from the surveying device 200. The point cloud data may be acquired after the range has been set in step S104 or after the sections have been set in step S105 described below.

Figure 4:
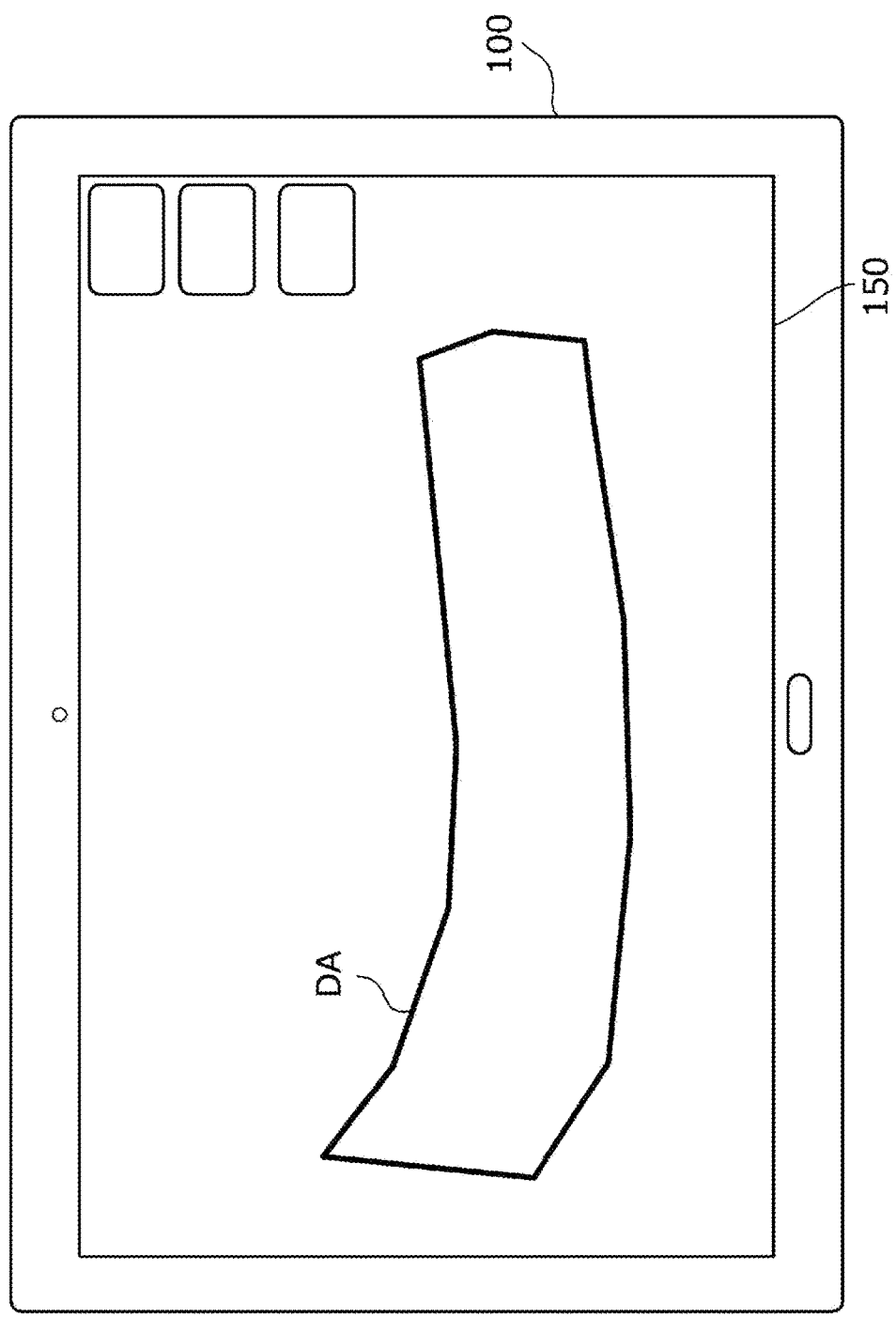
FIG. 4 illustrates an example of a screen image shown on an information display terminal.

In step S104, the range setting unit 122 sets the display range of the point cloud. FIG. 4 illustrates an example of a screen image shown on the terminal display unit 150 of the information display terminal 100. In the example in FIG. 4, the information display terminal 100 is a tablet terminal, the terminal display unit 150 is a liquid crystal display or an OLED display, and the terminal input unit 140 is an input unit implemented by a touch panel function of the display. In the example in FIG. 4, the terminal display unit 150 shows a map (not illustrated), such as a map drawing, an aerial photograph, or a design drawing. The map is shown as a background in the display range. The operator 2 refers to this map display and inputs a display range on the map display. The range setting unit 122 sets the display range based on the input display range. The operator 2 can input the display range by various methods including freely drawing boundary lines with a finger or a writing instrument such as a touch pen, or setting two points on a diagonal line to establish a rectangular area. In FIG. 4, the display range DA is shown on the map display. At this time, the position information is added on the display range DA. The terminal display unit 150 can show center portion information of the entire display range DA or the position information of each unit section together with the display range DA.

Figure 5:
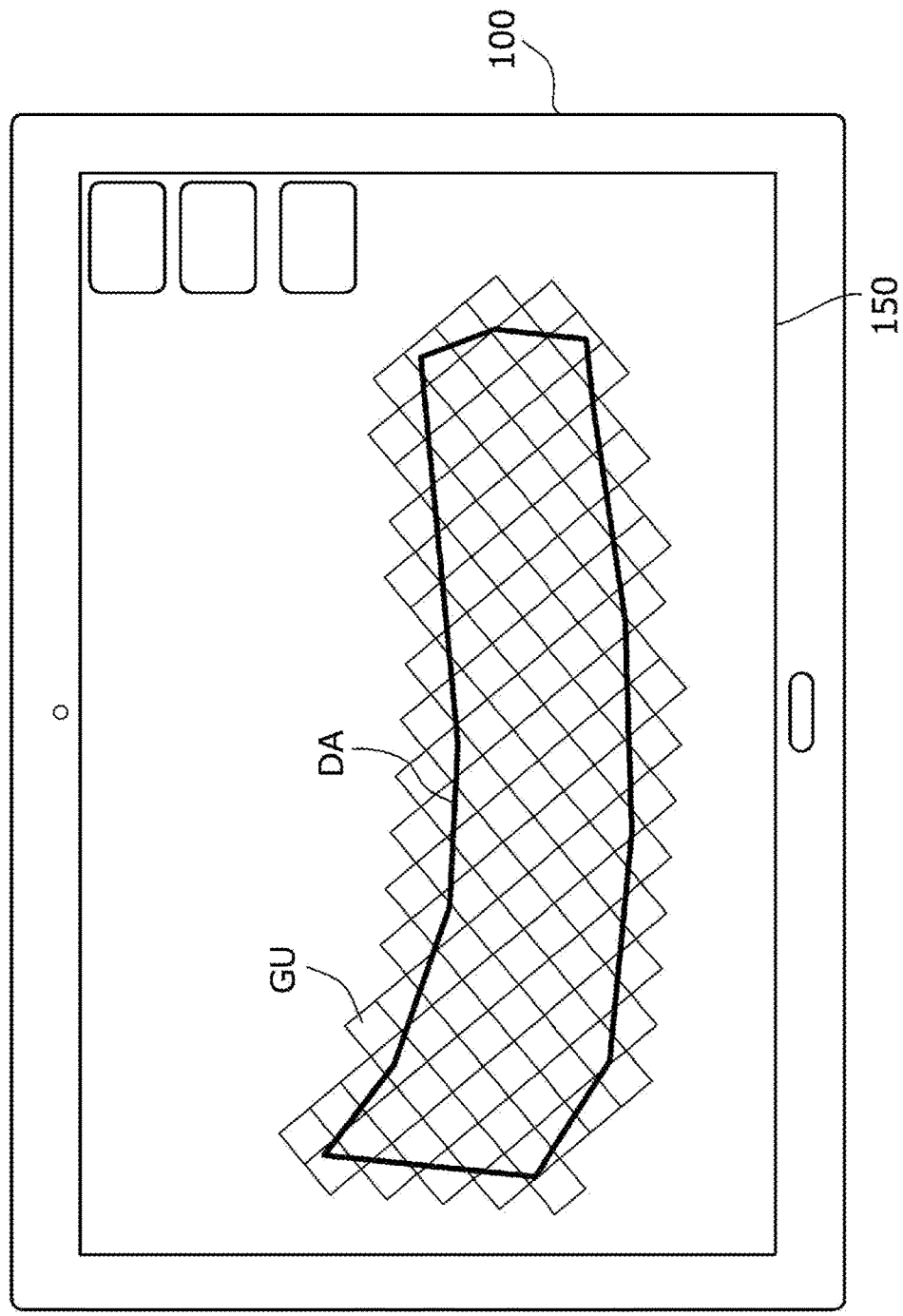
FIG. 5 illustrates another example of a screen image shown on the information display terminal.

In step S105, the section setting unit 123 divides the display range into predetermined unit sections. FIG. 5 illustrates another example of a screen image shown on the terminal display unit 150 of the information display terminal 100. In the example in FIG. 5, the display range DA is divided into a plurality of unit sections GU. In FIG. 5, the unit sections GU are illustrated in an exaggerated manner to facilitate understanding. In actual drawings, the unit sections GU will be in minute units such as dots or pixels. Further, in FIG. 5, unit sections GU outside the boundary line are shown where a boundary line of the display range DA intersects a unit section GU. However, the area outside the boundary line need not be shown. The acquired three-dimensional point cloud data can be managed regardless of being inside or outside the boundary line.

In step S106, the point cloud amount calculation unit 124 calculates the amount of point clouds in the space of each unit section GU. The amount of point clouds is calculated for all unit sections GU set by dividing the display range by the section setting unit 123 described above.

Figure 6:
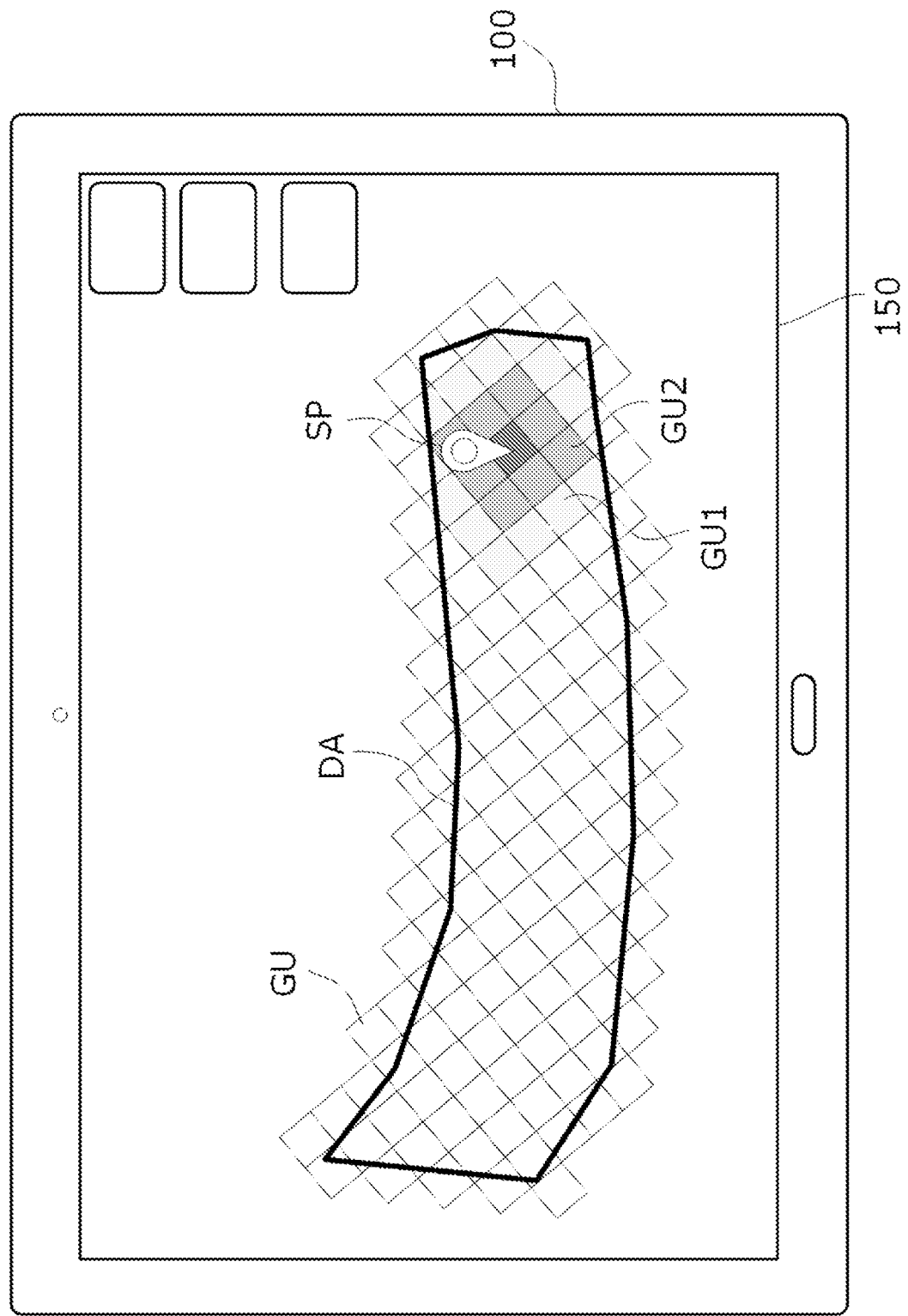
FIG. 6 illustrates yet another example of a screen image shown on the information display terminal.

In step S107, the point cloud amount display unit 125 shows each section of the display range on the information display terminal 100 in accordance with the amount of point clouds calculated for each unit section GU. FIG. 6 illustrates another example of a screen image shown on the terminal display unit 150 of the information display terminal 100. FIG. 6 illustrates an example where the surveying device 200 is installed in the unit section GU indicating (including) a position SP. In FIG. 6, this unit section GU and surrounding unit sections GU are denoted by shading indicating that point clouds have been surveyed, and the amount of point clouds based on the three-dimensional point cloud data acquired at the surveying device position SP is denoted by shading according to the amount of point clouds for each unit section GU surrounding the position SP. The amount of point clouds at the position at which the surveying device 200 is installed is low because point clouds are not actually acquired at or immediately below this position. However, in FIG. 6, the amount of point clouds is shown as being larger closer to the surveying device position SP for ease of understanding. For example, comparing the unit section GU2 and the unit section GU1, the unit section GU2 is shown in a darker color than that of the unit section GU1, allowing the operator 2 to intuitively understand that the amount of point clouds acquired for the unit section GU2 is larger. Similarly, information regarding the accuracy of installation can be shown in the form of the difference between comparison indicators, such as altitudes, according to point cloud data acquired from a plurality of installation positions. Showing the point cloud acquisition state and the difference between the comparison indicators intuitively and clearly using color coding in this manner allows the operator 2 to overview the whole display range at a glance, and easily check whether the amount of point clouds of the acquired three-dimensional point cloud data is sufficient for the required quantity and that the accuracy of installation meets the required accuracy, in each unit section GU within the display range under the point cloud amount management. This allows the operator 2 to efficiently perform scanning at the site and visually confirm the scanning state and the data acquisition result.

Figure 7:
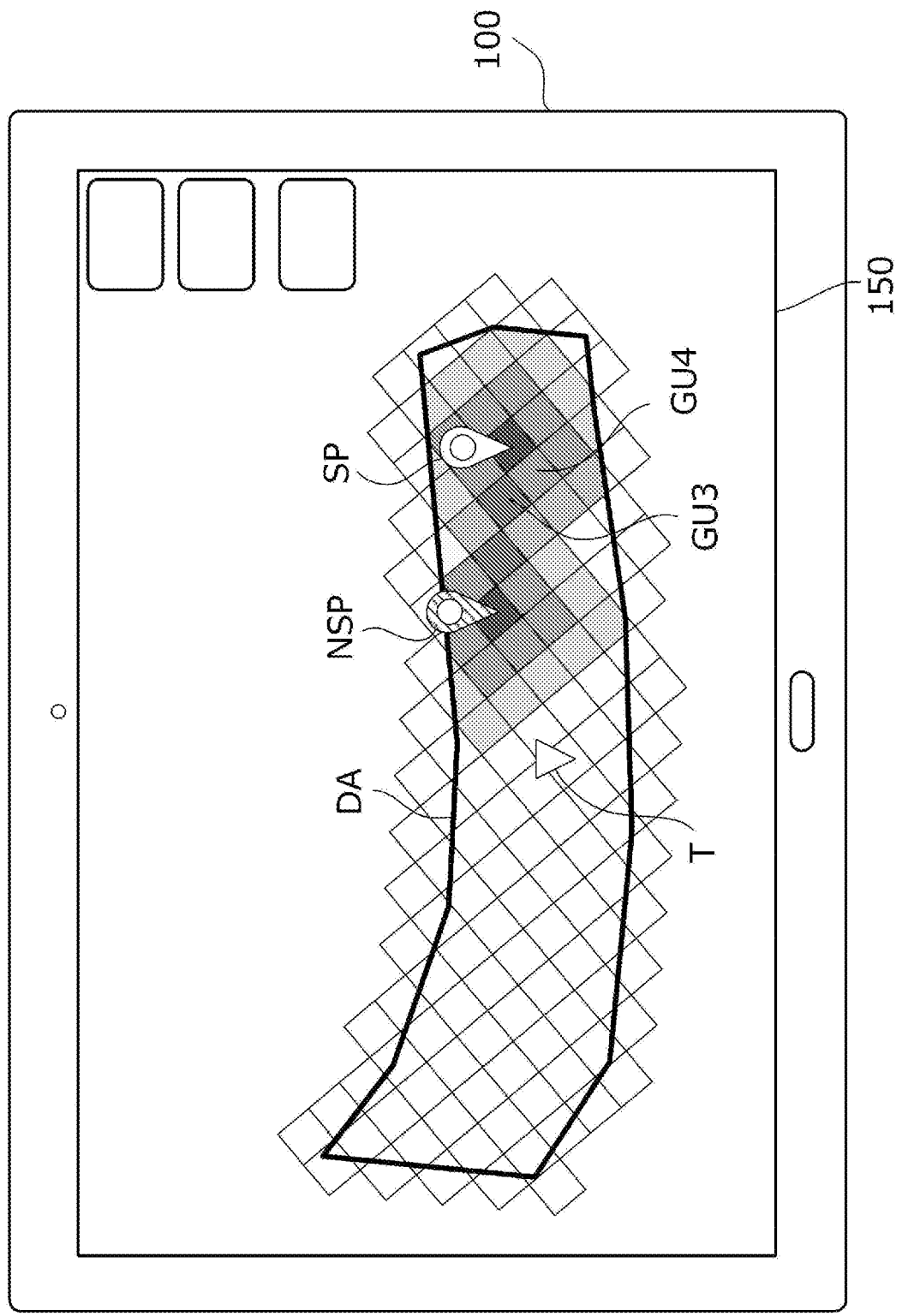
FIG. 7 illustrates yet another example of a screen image shown on the information display terminal.

FIG. 7 illustrates another example of a screen image shown on the terminal display unit 150 of the information display terminal 100. FIG. 7 illustrates an example of showing, on the terminal display unit 150, a sum acquired by adding a predicted value of the amount of point clouds that can be acquired in the next measurement to an existing value of an already acquired point cloud. The screen image in FIG. 7 follows after the screen image in FIG. 6, for example. When the surveying device 200 is installed at a new position NSP, the information display terminal 100 calculates a predicted value of the point cloud and, for an area in which measurement ranges overlap, calculates a sum acquired by adding the predicted value to the existing value. Subsequently, the terminal display unit 150 shows the unit sections in the display range in accordance with the amount of point clouds of the sum. In FIG. 7, a unit section GU3 is a unit section in which the measurement range of the surveying device 200 at the position SP and the measurement range of the surveying device 200 at the position NSP overlap. The terminal display unit 150 shows the sum acquired by adding the amount of point clouds that is the existing value measured at the position SP and the amount of point clouds that is the predicted value predicted to be subsequently acquired by measurement at the position NSP in the unit section GU3. Therefore, the terminal display unit 150 shows the amount of point clouds of the unit section GU3 in a color darker than that of a unit section GU4 where the two measurement ranges do not overlap. As a result, the operator 2 can perform surveying in consideration of where the surveying device 200 should be installed to acquire the point cloud so that work can proceed efficiently.

Figure 8:
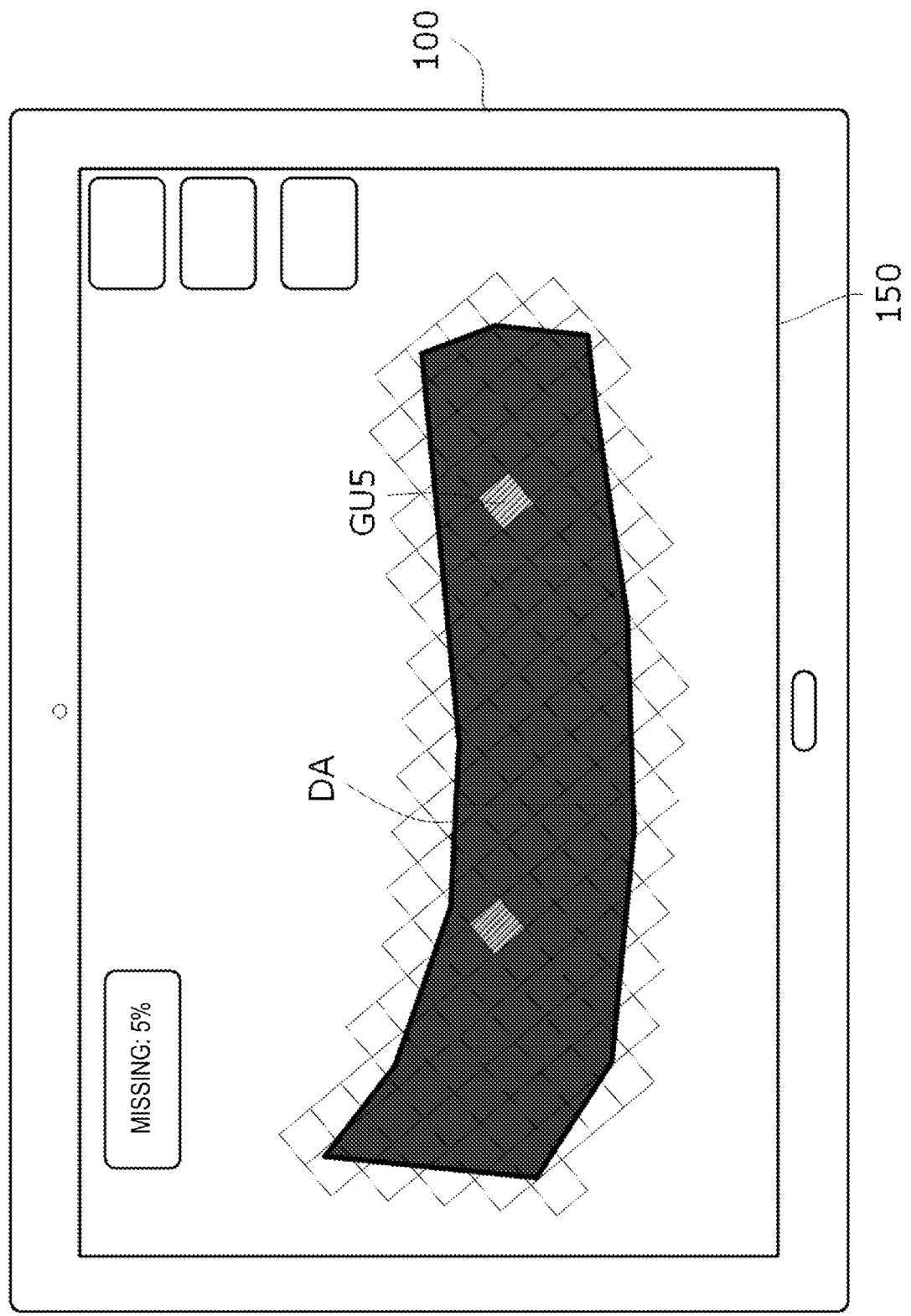
FIG. 8 illustrates yet another example of a screen image shown on the information display terminal.

FIG. 8 illustrates another example of a screen image shown on the terminal display unit 150 of the information display terminal 100. FIG. 8 illustrates an example of a so-called alert display related to a sufficiency rate, for example. The unit sections in the display range DA illustrated in FIG. 8 have a high amount of point clouds across substantially the entire region. However, the amount of point clouds is low in some sections, as indicated by "Missing: 5%" (meaning 5% of the unit sections across the entire display range are insufficient) in the upper left area of the screen image. For example, a unit section GU5 is a unit section having the amount of point clouds that does not satisfying the required amount of the point clouds, and is shown with hatching, for example, as an alert, differentiating such a unit section from other unit sections. The terminal display unit 150 may show the hatched unit section GU5 in a manner visually recognizable to the operator 2 by a pattern, coloring, numbers, letters, or a combination of these display modes, or by a change in one or more of these display modes. The point cloud amount management unit 126 determines to show such an alert in accordance with the level of the amount of point clouds of the unit section in comparison with the required amount of the point clouds stored in advance as described above. Thus, showing an alert for the unit section not having the required amount of the point clouds allows the operator 2 to perform point cloud acquisition tasks without omission. Further, showing such alerts for unit sections having low point cloud data accuracy and re-verifying factors, such as the surveying position and the installation method of the surveying device 200 that measured the point cloud data, and then requesting re-measurement accordingly, can easily improve the accuracy of the point cloud data.

Then, in step S108, the terminal display unit 150 shows the position (terminal position) of the information display terminal 100. The terminal display unit 150 shows the position of the information display terminal 100 as a terminal position T on the unit sections acquired by dividing and showing the display range in step S105.

In step S109, the point cloud amount display unit 125 shows, on the terminal display unit 150, an AR image in which the unit sections and the amount of point clouds are superimposed on the image captured by the terminal imaging unit 180 in the three-dimensional space, on the basis of the position of the information display terminal 100 on the local coordinates and the azimuth of the imaging direction of the terminal imaging unit 180. The two dimensional image and the AR image described above can be switched as appropriate by a switching operation input to the terminal input unit.

Figure 9:
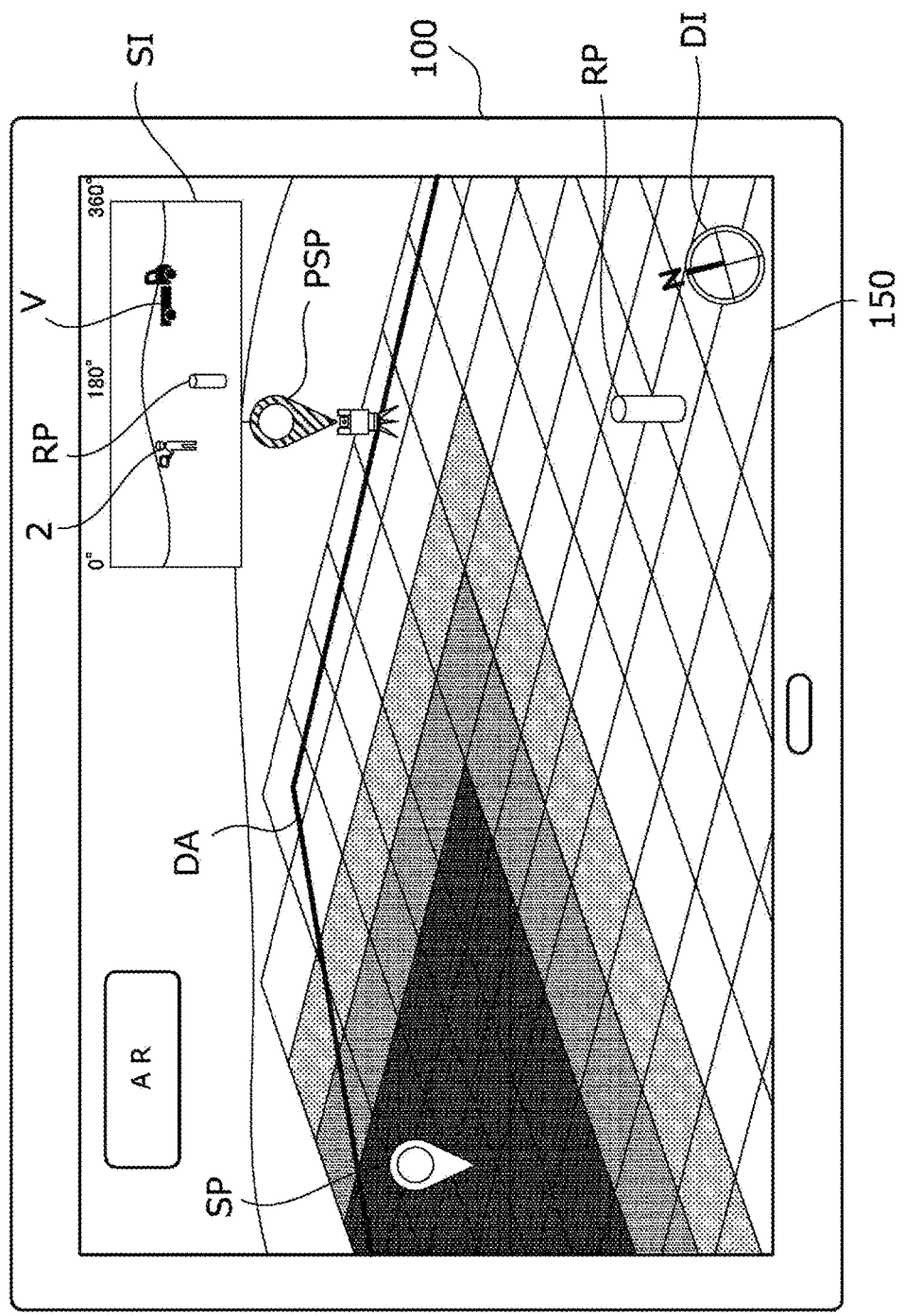
FIG. 9 illustrates yet another example of a screen image shown on the information display terminal.

FIG. 9 illustrates an example of an AR display screen image on the terminal display unit 150 of the information display terminal 100. FIG. 9 illustrates the terminal display unit 150 showing an AR image, where the image captured by the terminal imaging unit 180 is shown without change and the unit sections and the amount of point clouds in each unit section are superimposed on the image by color coding. Further, the terminal display unit 150 in FIG. 9 shows icons, each indicating the current installation position PSP of the surveying device 200, the surveying device position SP of the surveying device 200 at a past surveying time point, the position RP of the reference point, and azimuth information DI. Furthermore, the terminal display unit 150 shows a pop-up window SI of a panoramic image captured by the surveying instrument imaging unit 290 above the icon of the current installation position PSP. This panoramic image shows a scene as viewed from the surveying instrument imaging unit 290. The panoramic image also includes, for example, the operator 2, the reference point RP also shown on the AR image, and a movable body V.

In step S110, the information display terminal 100 remotely controls a specified surveying device 200 via the terminal input unit 140 on the basis of a point cloud measurement instruction, for example. For example, in FIG. 9, when the operator 2 selects the current installation position PSP of the surveying device 200 shown on the terminal display unit 150, the terminal display unit 150 shows a surveying setting screen image (not illustrated). The operator 2 then inputs surveying conditions on the surveying setting screen image and executes a surveying operation, causing the surveying device 200 to acquire point clouds according to the input surveying conditions. The operator 2 can identify the orientation of the surveying device 200 by referring to the point RP in the panoramic image. The operator 2 can select the reference point RP in the panoramic image to issue an instruction regarding the approximate position. The approximate position is used for a reference point scan for installing the surveying device 200 based on the reference point RP. The surveying device 200 that measures this instruction observes the reference point RP selected by the operator 2 and determines the instrument coordinates on the local coordinates. Furthermore, if the operator 2 sets, as a surveying condition, a surveyable range within the display range DA, the surveying device 200 measures point clouds excluding unsurveyable ranges.

Figure 10:
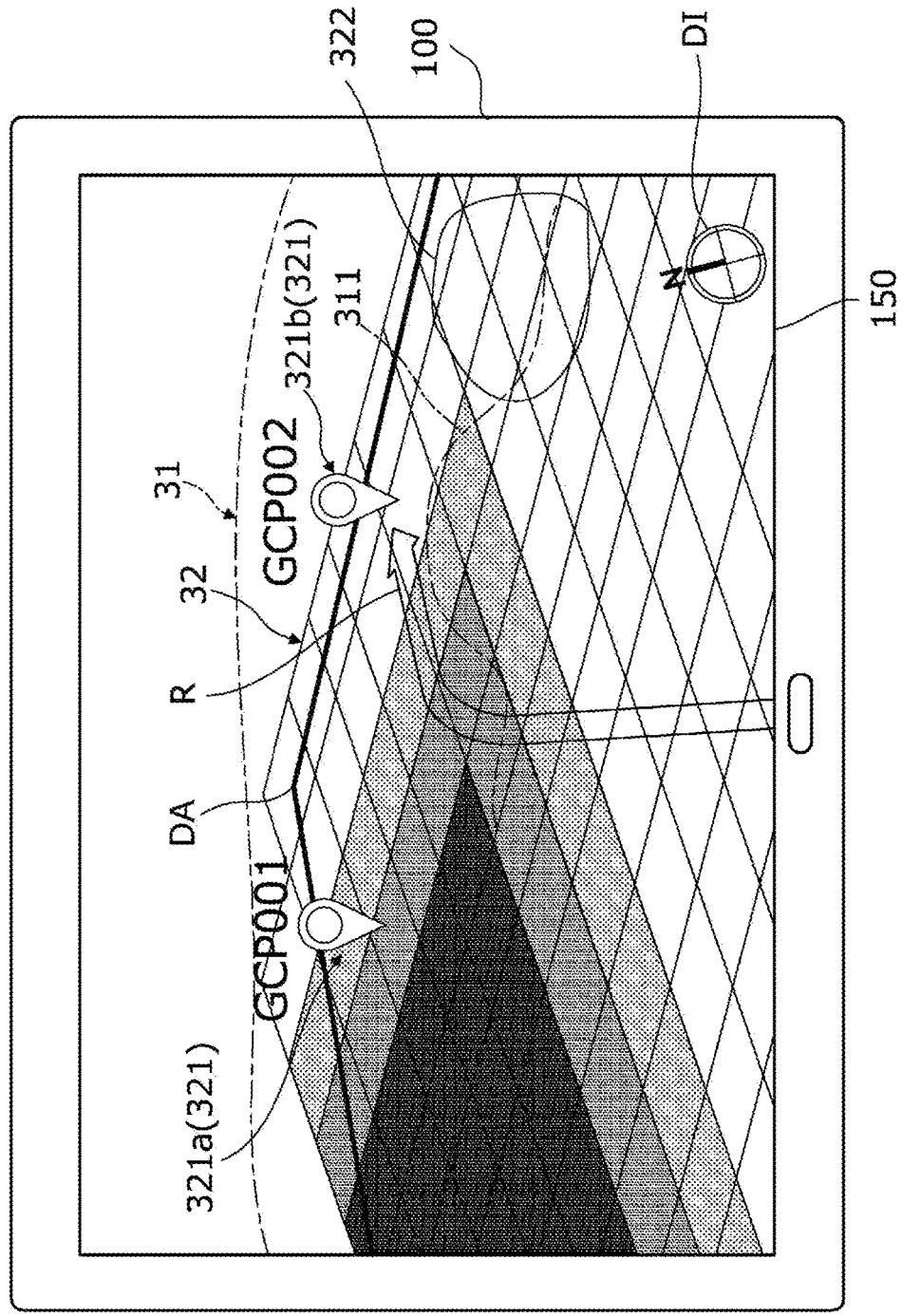
FIG. 10 illustrates an example of a screen image showing a first image and a second image on the information display terminal.

In step S111, the information display terminal 100 performs the surveying assistance function using the surveying assistance unit 127 described above. FIG. 10 illustrates an example in which the first image 31 of the measurement site and the second image 32 produced by CG or other methods from information regarding the measurement site are shown on the terminal display unit 150. Further, in FIG. 10, for ease of description, the first image 31 is schematically indicated by a dashed-dotted line, and the first image 31 and the second image 32 are superimposed on each other. The measurement site shown as the first image 31 includes an embankment 311 that is not level as topography and landscaping. With reference to the display content in FIG. 10, description will now be made of the display function for a pile point position, the display function for a danger zone, the display function for a blind spot, the position correction function, the guidance function, the warning function, and the linkage function.

The display function for a pile point position and the display function for a blind spot show pile positions and pile numbers, which is information regarding the measurement site that is hard to see, as icon images of a pile point 321. An icon image of a pile point 321*a* represents a pile with a pile number "GCP001," and an icon image of a pile point 321*b* represents a pile with a pile number "GCP002." In the display example illustrated in FIG. 10, the screen image of the terminal display unit 150 shows that the imaging range includes a plurality of piles, and the presence of the piles cannot be visually confirmed from the first image due to the distance between the piles and the information display terminal 100, or the piles being positioned in blind spots in the topography and landscaping, for example. However, when the terminal display unit 150 shows the icon images of a pile point 321 as the second image 32, the operator 2 can easily identify the positions of the piles even when the piles are hard to see from the position of the information display terminal 100.

The display function for a danger zone is a function by which, when there is a danger zone in the display range in FIG. 10, the terminal display unit 150 shows the range of the area and the type of danger as the second image 32 in an appropriate display mode, for example.

The guidance function shows a recommended route R when the operator 2 specifies a position of a movement destination from the measurement site shown on the terminal display unit 150. This recommended route R is shown from the current position of the information display terminal 100 to the position of the movement destination. In the example of FIG. 10, the pile number "GCP002" is selected as the movement destination by an instruction of selecting the icon image of a pile point 321*b*. The recommended route R is indicated by an arrow linking the current position to the movement destination. In the example of FIG. 10, the presence of the embankment 311 between the current position and the pile with the pile number "GCP002," which is the movement destination, can be recognized on the information display terminal 100 side, for example, by acquiring the point cloud data in advance. Thus, the recommended route R is shown not as a straight route but as a curved route, avoiding the embankment 311. A plurality of the recommended routes R (e.g., both routes passing along the left side and the right side of the embankment 311 when viewed from the information display terminal 100 side) may be shown to allow the operator 2 to select the actual route to be used. The terminal display unit 150 may show the distance of each recommended route R.

The position correction function corrects the position information of the information display terminal 100 after the information display terminal 100 is moved to the pile with the pile number "GCP002," for example. This correction involves acquiring the pile identification information 128*a* from the identifier (similar to the identifier RP1 in FIG. 1) of the pile by the information display terminal 100. An example of the method of correcting the position information is as described above.

The warning function can issue a warning by display on the terminal display unit 150 or another indicator when, for example, an inappropriate area, such as an area outside of the display range DA, is selected as a scanning instruction.

The linkage function allows a drawing input using the external device 400 to be reflected into drawing content of the second image on the terminal display unit 150. In FIG. 10, a frame line indicating an area input by handwriting is shown as an image 322 representing an illustration or a rough sketch input using the external device 400 illustrated in FIG. 1. Accordingly, the operator 2 at the site holding the information display terminal 100 can share information with another person at another location, such as with a manager or another operator 2, while viewing the display on the screen image.

When the processing of step S111 is complete, the operator 2 can move the surveying device 200 to the next installation location to scan an area with a small amount of point clouds, and repeat the processing from steps S101 to S111, as necessary, using the information display terminal 100. At this time, one or some of those steps S101 to S111 may be skipped appropriately.

The above disclosure has described technology used for scanning work at a surveying and measuring site. This technology utilizes AR technology to confirm current conditions of the site and assist surveying. The surveying assistance system according to an embodiment of the present disclosure is the surveying assistance system including the information display terminal 100 and the surveying device 200 configured to measure a point cloud in a three-dimensional space, the surveying assistance system including the terminal display unit 150 configured to show the first image 31 of a measurement site captured from the position of the information display terminal 100 and the second image 32 produced from information regarding the measurement site, and the surveying assistance unit 127 configured to assist measurement performed by the surveying device 200, by using the terminal display unit 150. Thus, the surveying assistance system, the information display terminal 100, the surveying assistance method, and the surveying assistance program can facilitate intuitive and easy identification of work conditions and subsequent work content as well as efficient scanning at the site.

Further, a configuration including the point cloud amount display unit 125 configured to cause the information display terminal 100 to show, as the second image 32, the amount of point clouds for each of unit sections, the unit sections being acquired by dividing the display range of the surveying information in the imaging range of the information display terminal 100. This allows the operator 2 to check the point cloud data acquisition state near each location after moving to any location of the measurement site. Thus, the operator 2 can easily and reliably identify the acquisition state.

Further, a configuration in which the information display terminal 100 shows, as the second image 32 shown on the terminal display unit 150, the recommended route R from the current position of the information display terminal 100 to a position of a movement destination can allow the operator 2 to move safely and efficiently while holding the information display terminal 100.

Further, a configuration in which the information display terminal 100 determines the movement destination of the information display terminal 100 and shows the recommended route R on the basis of a surveying scan plan set in advance can reduce work burden on the operator 2 when considering the route to the next movement destination while viewing the point cloud data acquisition state.

Further, a configuration in which the information display terminal 100 shows, as the second image 32, the icon image of a pile point 321 at a position of an actual pile, receives selection of the icon image of a pile point 321, and shows the recommended route R from the current position of the information display terminal 100 to the selected position can allow the operator 2 to easily select a pile and quickly show the route of movement from the current position to the selected pile, even when the pile is in a hard-to-see position.

Further, description has been made of the information display terminal 100 including the terminal storage unit 120 that stores the pile information table 128 in which the pile identification information 128a and the pile position information 128b are associated. In this configuration, the information display terminal 100 reads the identifier RP1 associated with the pile identification information 128a from a pile installed at the measurement site, and corrects the position information of the information display terminal 100 according to a position of the pile (pile position information 128b) corresponding to the pile identification information 128a. With this configuration, since the position of the information display terminal 100 corresponds to the position information (or coordinate information) of the site, positional deviation between the image captured by the terminal imaging unit 180 and the image of the point cloud data acquired by the surveying device 200 (that is, positional deviation between the first image 31 and the second image 32) can be suppressed.

Further, the terminal display unit 150 shows, as the second image 32, information regarding the measurement site located in a blind spot in the first image 31. With this configuration, the operator 2 can easily identify information regarding the measurement site even when a pile or similar object that is hard for the operator 2 to see from the information display terminal 100 is present in the measurement site.

Further, by showing a danger zone in the second image 32 on the terminal display unit 150, the operator 2 can be notified of an area requiring caution when passing or an area prohibiting entry, for example, ensuring the safety of the operator 2.

Further, a configuration in which the information display terminal 100 causes a drawing input using the external device 400 sharing the first image 31 and the second image 32 with the information display terminal 100 to be reflected into drawing content of the second image 32 of the terminal display unit 150 allows information to be readily transmitted from the external device 400 positioned at a remote location to the operator 2. With such a configuration, a plurality of the operators 2 and a plurality of users, such as administrators, can perform tasks such as surveying in cooperation with each other.

Further, the surveying system 1 of the disclosure uses the information display terminal 100 and the surveying device 200 configured to measure point clouds in a three-dimensional space, and includes the surveying information acquisition unit 121, the range setting unit 122, the section setting unit 123, the point cloud amount calculation unit 124, the point cloud amount display unit 125, and the terminal position acquisition unit 160. The surveying information acquisition unit 121 acquires, from the surveying device 200, the surveying information including the point cloud data associated with the position information. The range setting unit 122 sets a display range of the point cloud. The section setting unit 123 divides the display range into the predetermined unit sections. The point cloud amount calculation unit 124 calculates the amount of point clouds in the space in each unit section. The point cloud amount display unit 125 causes the information display terminal 100 to show the information according to the amount of point clouds for each unit section calculated by the point cloud amount calculation unit 124 for each section of the display range. The terminal position acquisition unit 160 can acquire the position information of the information display terminal 100. Further, the point cloud amount display unit 125 can transform or adjust the coordinates of the position information acquired by the terminal position acquisition unit 160 to local coordinates including the display range of the point cloud, and show, on the information display terminal 100, the position of the information display terminal 100 on the local coordinates. With this configuration, the operator 2 can easily confirm the position of the information display terminal 100 and whether the required volume of the three-dimensional point cloud data has been acquired for each section in the display range under point cloud amount management, and efficiently perform scanning at the site and visually confirm the state of scanning and the result of data acquisition.

In particular, the point cloud amount display unit 125 can, in response to a user operation when the information display terminal 100 is positioned on a known point on the local coordinates, transform or adjust the coordinates of the information display terminal 100 to the local coordinates, adjusting the position information of the information display terminal 100 to the local coordinates.

Further, the point cloud amount display unit 125 shows the unit sections and the position of the surveying device 200 superimposed on the image captured by the terminal imaging unit 180, on the basis of the position of the information display terminal 100 on the local coordinates and the azimuth of the imaging direction of the terminal imaging unit 180. With this configuration, the operator 2 can more easily identify the conditions at the surveying site.

Via the terminal input unit 140, the surveying system 1 can provide instructions for the point cloud measurement range to the surveying device 200 showing its position superimposed on the image, and this can allow the operator 2 to perform scanning more efficiently at the site.

Further, since the surveying device 200 can measure point clouds only within the display range of the point cloud set by the range setting unit 122, unnecessary point cloud measurement can be reduced and the efficiency of scanning at the site can be further improved.

The surveying system 1 further includes the point cloud amount management unit 126 configured to cause the information display terminal 100 to show, when the unit sections of the display range include a unit section having the amount of point clouds not satisfying the predetermined required amount of the point clouds, information indicating the point cloud insufficiency. With this configuration, the operator 2 can perform point cloud acquisition tasks without omission.

Further, the point cloud amount calculation unit 124 calculates the amount of point clouds in the space within the predetermined altitude range for each unit section, and the point cloud amount display unit 125 causes the information display terminal 100 to show each section in accordance with the amount of point clouds in the space within the predetermined altitude range. With this configuration, the operator 2 can check the point cloud acquisition state within a desired altitude range.

Further, the point cloud amount calculation unit 124 calculates a value of the indicator of sufficiency to the required amount of the point clouds in the display range or the unit section, and the point cloud amount display unit 125 causes the information display terminal 100 to show the indicator of sufficiency. With this configuration, the operator 2 can check the point cloud acquisition state quantitatively.

Further, the surveying information acquisition unit 121 acquires the position information of the surveying device 200, the point cloud amount calculation unit 124 uses the position of the surveying device 200 to determine the range and calculate the predicted values of the amount of point clouds acquirable when the point cloud is surveyed at that position, and the point cloud amount display unit 125 causes the information display terminal 100 to show each section according to the predicted values, Thus, the operator 2 can understand how many point clouds are acquired when the surveying device 200 is installed at that position, and efficiently proceed with the point cloud acquisition task.

Further, the point cloud amount calculation unit 124 calculates a sum when, at the time of calculation of the predicted value, there exists, within the range to be predicted, an overlapping section already having an existing value of the amount of point clouds calculated on the basis of the surveying information. This sum is acquired by adding the already calculated amount of point clouds and the predicted value of the amount of point clouds for the overlapping section. Further, the point cloud amount display unit 125 causes the information display terminal 100 to show each section according to the sum. With this configuration, the operator 2 can easily understand how many point clouds are acquired when the surveying device 200 is installed at that position on the basis of actual past results already measured, and can efficiently proceed with the point cloud acquisition task.

Further, the point cloud amount calculation unit 124 targets, among the point cloud data acquired by the surveying information acquisition unit 121, only point cloud data satisfying predetermined conditions, based on factors including a measured distance and an incident angle, for calculating the amount of point clouds, thereby reducing unnecessary data and improving the efficiency of point cloud data processing.

Further, the point cloud amount management unit 126 uses the point cloud data measured from the plurality of installation positions to calculate the accuracy of the installation position of the surveying device 200, and causes the information display terminal 100 to show information regarding the accuracy of the installation. With this configuration, the operator 2 can easily confirm and correct the appropriateness of the installation and further improve the efficiency of scanning.

Although embodiments of the disclosure have been described above, aspects of the disclosure are not limited to the embodiments.

In the embodiments described above, the scanner unit 260 of the surveying device 200 is a laser scanner, but the scanner unit that performs measurement for acquiring the three-dimensional point cloud data is not limited to the scanner unit 260. For example, as the scanner unit, LIDAR for measuring a distance by measuring scattered light of a laser beam emitted in a pulsed manner may be used. Alternatively, the scanner unit may include an imaging unit such as a camera, and the point cloud data generation unit may produce point cloud data from one or more images captured by the imaging unit using a so-called SfM method or a photogrammetry method.

Further, in the embodiments described above, an example in which the unit sections and the amount of point clouds in each unit section is shown on the terminal display unit 150 of the information display terminal 100 has been described. However, this information may be shown on another display unit. For example, the unit sections and the information regarding each unit section may be transmitted to the surveying device, and the surveying instrument display unit of the surveying device may be used as the information terminal display unit of the disclosure and show the unit sections and the information regarding the amount of point clouds in each unit section.

Further, in the processing flow of the embodiments described above, the processing related to the AR display from S108 to S110 is performed after the processing related to the display of the amount of point clouds from S103 to S107 in FIG. 3. However, the order of processing is not limited to this processing flow. For example, the processing from S108 to S110 may be performed first. Specifically, the surveying device may measure the point cloud by remote control based on the AR display on the information display terminal (processing from steps S108 to S110), and then the amount of point clouds based on the three-dimensional point cloud data acquired by this measurement may be shown (processing from steps S103 to S107).

Further, the processing of steps S101 and S102 is not limited to being executed before the processing of step S103, and may be executed at a timing between the processing of steps S107 and S108.

Further, the method of causing a terminal display unit to show the first image and the second image may include a method of causing the terminal display unit 150 to show the first image and the second image at corresponding positions (or related positions). This method of showing the first image and the second image may be, for example, a display method in which the first image and the second image are shown simultaneously on the screen image of the terminal display unit 150 or shown individually on the screen image of the terminal display unit 150 so as to be switchable as desired, or may be a display method in which the first image and the second image are shown overlapping each other or separated from each other on the terminal display unit 150.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

The invention claimed is:

1. A surveying assistance system including an information display terminal and a surveying device, which is a three-dimensional scanner device or a three-dimensional laser scanner device, configured to measure a point cloud in a three-dimensional space, the surveying assistance system comprising:
a terminal display device configured to show a first image of a measurement site captured from a position of the information display terminal and a second image produced from information regarding the measurement site,
a surveying assistance unit configured to assist measurement performed by the surveying device, by using the terminal display device; and
a storage unit configured to store a pile information table in which pile identification information and pile position information are associated,
wherein the information display terminal shows, as the second image shown on the terminal display device, a recommended route from a current position of the information display terminal to a position of a movement destination,
the information display terminal shows, as the second image, an icon image of a pile point at a position of an actual pile, receives selection of the icon image of the pile point, and shows the recommended route from the current position of the information display terminal to the selected position, and
the information display terminal reads an identifier associated with the pile identification information from a pile installed at the measurement site, and corrects position information of the information display terminal according to a position of the pile corresponding to the pile identification information.

2. The surveying assistance system according to claim 1, further comprising:
a point cloud amount display unit configured to cause the information display terminal to show, as the second image, the amount of point clouds for each of unit sections, the unit sections being acquired by dividing a display range of surveying information in an imaging range of the information display terminal.

3. The surveying assistance system according to claim 1, wherein the information display terminal determines the movement destination of the information display terminal and shows the recommended route on the basis of a surveying scan plan set in advance.

4. The surveying assistance system according to claim 1, wherein the terminal display device shows, as the second image, information regarding the measurement site located in a blind spot in the first image.

5. The surveying assistance system according to claim 1, further comprising:
an external device,
wherein the information display terminal reflects a drawing input using the external device into drawing content of the second image of the terminal display device, the external device sharing the first image and the second image with the information display terminal.

6. An information display terminal, comprising:
a terminal display device configured to show a first image of a measurement site captured by a terminal imaging unit and a second image produced from information regarding the measurement site;
a surveying assistance unit configured to assist measurement performed by a surveying device, which is a three-dimensional scanner device or a three-dimensional laser scanner device, that measures a point cloud in a three-dimensional space, by using the terminal display device; and
a storage unit configured to store a pile information table in which pile identification information and pile position information are associated,
wherein the terminal display device shows, as the second image a recommended route from a current position of the information display terminal to a position of a movement destination;
the terminal display device shows, as the second image, an icon image of a pile point at a position of an actual pile, receives selection of the icon image of the pile point, and shows the recommended route from the current position of the information display terminal to the selected position; and
the surveying assistance unit reads an identifier associated with the pile identification information from a pile installed at the measurement site, and corrects position information of the information display terminal according to a position of the pile corresponding to the pile identification information.

7. A surveying assistance method for a surveying assistance system including an information display terminal and a surveying device, which is a three-dimensional scanner device or a three-dimensional laser scanner device, configured to measure a point cloud in a three-dimensional space, the surveying assistance method comprising:
showing, on a terminal display device, a first image of a measurement site captured from a position of the information display terminal and a second image produced from information regarding the measurement site,
assisting measurement performed by the surveying device, by using the terminal display device via a surveying assistance device; and
storing, in a storage unit, a pile information table in which pile identification information and pile position information are associated,
wherein the information display terminal shows, as the second image shown on the terminal display device, a recommended route from a current position of the information display terminal to a position of a movement destination;
the information display terminal shows, as the second image, an icon image of a pile point at a position of an actual pile, receives selection of the icon image of the pile point, and shows the recommended route from the current position of the information display terminal to the selected position, the information display terminal reads an identifier associated with the pile identification information from a pile installed at the measurement site, and corrects position information of the information display terminal according to a position of the pile corresponding to the pile identification information.

8. A non-transitory computer readable storage medium storing a surveying assistance program for a surveying assistance system including an information display terminal and a surveying device, which is a three-dimensional scanner device or a three-dimensional laser scanner device, configured to measure a point cloud in a three-dimensional space, the surveying assistance program being configured to cause a computer to execute:

showing, on a terminal display device, a first image of a measurement site captured from a position of the information display terminal and a second image produced from information regarding the measurement site;

assisting measurement performed by the surveying device, by using the terminal display device via a surveying assistance device; and storing, in a storage unit, a pile information table in which pile identification information and pile position information are associated, wherein the information display terminal shows, as the second image shown on the terminal display device, a recommended route from a current position of the information display terminal to a position of a movement destination;

the information display terminal shows, as the second image, an icon image of a pile point at a position of an actual pile, receives selection of the icon image of the pile point, and shows the recommended route from the current position of the information display terminal to the selected position; and the information display terminal reads an identifier associated with the pile identification information from a pile installed at the measurement site, and corrects position information of the information display terminal according to a position of the pile corresponding to the pile identification information.

\* \* \* \* \*